United States Patent
Seay et al.

(10) Patent No.: US 10,150,663 B2
(45) Date of Patent: Dec. 11, 2018

(54) AUTOMATIC FLAVORING AND WATER DISPENSING SYSTEMS FOR MEDICATIONS

(71) Applicant: Fillmaster Systems, LLC, Columbia, MD (US)

(72) Inventors: Michael Seay, Washington, DC (US); Stuart R. Amos, Phoenix, MD (US); Kevin Barnes, Baltimore, MD (US); Joshua Barnes, Baltimore, MD (US); Kevin Kubit, Annapolis, MD (US); Brad Humbert, Westminster, MD (US); Adam Delecki, Radnor, PA (US)

(73) Assignee: Fillmaster Systems, LLC, Columbia, MD (US)

( * ) Notice: Subject to any disclaimer, the term of this patent is extended or adjusted under 35 U.S.C. 154(b) by 0 days.

(21) Appl. No.: 15/268,077

(22) Filed: Sep. 16, 2016

(65) Prior Publication Data

US 2017/0081168 A1    Mar. 23, 2017

Related U.S. Application Data

(60) Provisional application No. 62/219,911, filed on Sep. 17, 2015.

(51) Int. Cl.
*B67D 7/14* (2010.01)
*A23L 2/56* (2006.01)
(Continued)

(52) U.S. Cl.
CPC ............ *B67D 7/14* (2013.01); *A23L 2/56* (2013.01); *B67D 7/02* (2013.01); *B67D 7/42* (2013.01);
(Continued)

(58) Field of Classification Search
CPC ... B67D 7/14; B67D 7/02; B67D 7/42; B67D 7/78; G05D 7/0635; G05B 15/02; A23L 2/56; A23V 2002/00
(Continued)

(56) References Cited

U.S. PATENT DOCUMENTS

| 5,033,651 A | 7/1991 | Whigham et al. |
| 5,072,859 A | 12/1991 | Wiley et al. |

(Continued)

FOREIGN PATENT DOCUMENTS

| EP | 2208679 A1 | 7/2010 |
| WO | 00/54724 A2 | 9/2000 |
| WO | 2012/135917 A1 | 10/2012 |

OTHER PUBLICATIONS

International Search Report and Written Opinion of the International Searching Authority dated Apr. 10, 2017 for PCT/US2016/052253 filed Sep. 16, 2016, Forms PCT/ISA/210, PCT/ISA/237.

*Primary Examiner* — Ziaul Karim
(74) *Attorney, Agent, or Firm* — Alan G. Towner; Leech Tishman Fuscaldo & Lampl

(57) ABSTRACT

Automatic flavoring and water dispensing systems are disclosed. The systems may be used to add flavorings to medications, and to reconstitute medications by adding water. The systems include multiple flavoring containers communicating with a valve assembly that controls the type and amount of each flavoring to be delivered during a dispensing operation. Water for reconstitution purposes may be provided through the flavoring valve assembly and/or through a separate valve. An input device such as a code scanner may be used to input data regarding the type of medication to be flavored into the system, and a flavoring formulary may be used to provide multiple flavoring options. The dispensing system allows for automatic dis-
(Continued)

pensing of medication flavorings and/or reconstitution water from a single unit.

17 Claims, 18 Drawing Sheets

(51) Int. Cl.
 *B67D 7/02*   (2010.01)
 *B67D 7/42*   (2010.01)
 *B67D 7/78*   (2010.01)
 *G05B 15/02*  (2006.01)
 *G05D 7/06*   (2006.01)
 *G07F 17/00*  (2006.01)

(52) U.S. Cl.
 CPC ............... *B67D 7/78* (2013.01); *G05B 15/02* (2013.01); *G05D 7/0635* (2013.01); *G07F 17/0064* (2013.01); *G07F 17/0092* (2013.01); *A23V 2002/00* (2013.01)

(58) Field of Classification Search
 USPC ........................................................ 700/283
 See application file for complete search history.

(56) References Cited

U.S. PATENT DOCUMENTS

| | | | |
|---|---|---|---|
| 5,778,761 A * | 7/1998 | Miller | B01F 15/00032 222/129.1 |
| 7,159,743 B2 | 1/2007 | Brandt et al. | |
| 7,337,920 B2 | 3/2008 | Duck et al. | |
| 7,383,966 B2 | 6/2008 | Ziesel | |
| 8,047,401 B2 * | 11/2011 | Holler | B67D 1/0078 222/61 |
| 8,561,841 B2 | 10/2013 | Erman et al. | |
| 8,631,974 B2 | 1/2014 | Piatnik et al. | |
| 8,820,580 B2 | 9/2014 | Ziesel | |
| 9,271,604 B2 | 3/2016 | Hecht | |
| 9,296,603 B1 | 3/2016 | Cole et al. | |
| 2008/0022694 A1 * | 1/2008 | Anderson | B01D 5/0072 62/3.4 |
| 2009/0001093 A1 | 1/2009 | Labhard | |
| 2009/0188938 A1 * | 7/2009 | Farris | B67D 1/0018 222/1 |
| 2011/0073618 A1 * | 3/2011 | Anderson | B67D 1/07 222/148 |
| 2014/0361041 A1 | 12/2014 | Hawken | |

* cited by examiner

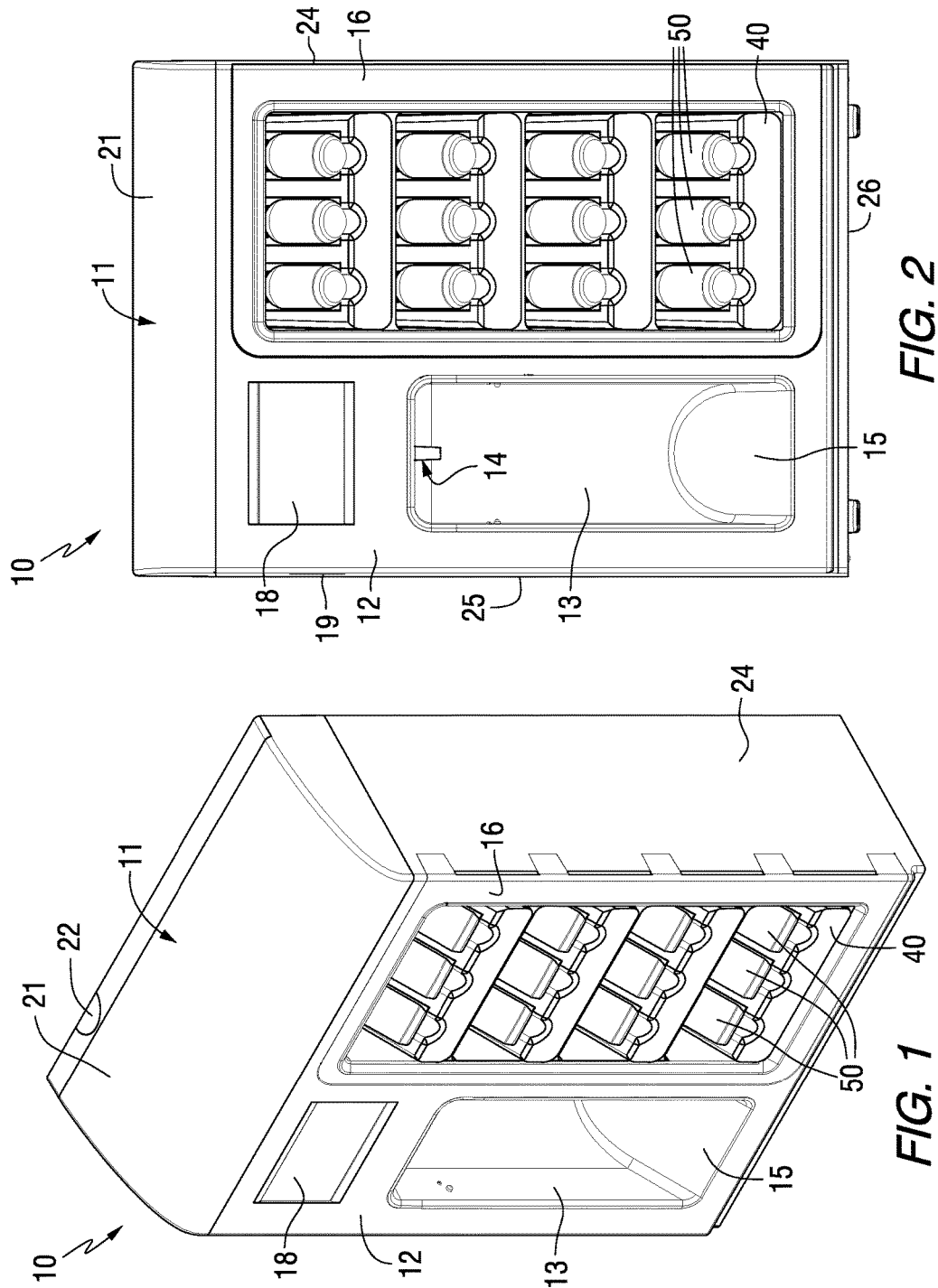

AUTOMATIC FLAVORING AND WATER DISPENSING SYSTEMS FOR MEDICATIONS

CROSS-REFERENCE TO RELATED APPLICATION

This application claims the benefit of U.S. Provisional Patent Application Ser. No. 62/219,911 filed Sep. 17, 2015, which is incorporated herein by reference.

FIELD OF THE INVENTION

The present invention relates to automated fluid delivery systems, including automated systems for dispensing flavorings and water for medications and other applications requiring flavoring.

BACKGROUND INFORMATION

Commercial pharmaceutical products are available with FDA approval in a limited number of flavored alternatives. Allowing patients multiple choices of flavor and taste profiles can aid the palatability of liquid medications and increase compliance and adherence among patients including children. Various types of medications would benefit from improved flavoring. For example, while many liquid medications come in flavored forms, they still tend to taste bad and their flavors can be improved. It is known to add one or more types of flavoring to liquid medications by manually selecting and adding the flavorings to the medications based upon various types of flavor recipes. However, such manual selection can be time-consuming and may not result in optimal flavoring combinations.

SUMMARY OF THE INVENTION

The present invention provides automatic flavoring and water dispensing systems. The systems may be used to add flavorings to medications, and to reconstitute medications by adding water. The systems include multiple flavoring containers communicating with a valve assembly that controls the type and amount of each flavoring to be delivered during a dispensing operation. Water for reconstitution purposes may be provided through the flavoring valve assembly and/or through a separate valve. An input device such as a code scanner may be used to input data regarding the type of medication to be flavored into the system, and a flavoring formulary may be used to provide multiple flavoring options. The dispensing system allows for automatic dispensing of medication flavorings and/or reconstitution water from a single unit.

An aspect of the present invention is to provide an automatic medication flavoring and water dispensing system comprising multiple medication flavoring container receiving cradles including a flavoring extraction fixture and a flavoring delivery line corresponding to each cradle, a water supply line, a valve assembly in flow communication with the flavoring delivery lines structured and arranged to selectively control flow of multiple flavorings from the flavoring delivery lines to a flavoring outlet of the valve assembly, and a flavoring and water dispensing nozzle assembly in flow communication with the flavoring outlet of the valve assembly and the water supply line.

Another aspect of the present invention is to provide a valve assembly for use in an automatic flavoring dispensing system comprising an upper valve block, a solenoid valve assembly mounted on the upper valve block comprising multiple solenoids with solenoid valve plungers extending through the upper valve block, a lower valve block comprising multiple flavoring delivery holes extending through the lower valve block and aligned with corresponding ones of the solenoid valve plungers, multiple flavoring delivery channels in an upper surface of the lower valve block in controllable fluid flow communication with the multiple flavoring delivery holes, and a deformable valve membrane between the upper and lower valve blocks structured and arranged to block the flavoring delivery holes when the solenoid valve plungers are in extended positions pressing against portions of the valve membrane, and to allow flow through the flavoring delivery holes and into the multiple flavoring delivery channels when the solenoid valve plungers are in retracted positions.

A further aspect of the present invention is to provide a liquid flavoring container and cap assembly comprising a flavoring container body, a container cap sealed to the flavoring container body comprising a sealable pressurized air inlet port extending through a top face of the cap into an interior of the flavoring container body, and a sealable flavoring outlet port extending through the top face of the cap into the interior of the flavoring container body, and a flavoring extraction tube in fluid communication with the flavoring outlet port and extending downward to a bottom corner of the flavoring container body.

Another aspect of the present invention is to provide a method for determining an amount of medication flavoring to include in a composition to be dispensed by a dispensing apparatus. The method comprises: receiving, by an electronic computer processor of a dispensing apparatus, indicia data associated with at least one medication; determining, by the processor, compositional attribute data associated with the medication in response to the received indicia data; receiving, by the processor, data representing at least one dispensing option associated with the composition to be dispensed by the dispensing apparatus; and determining, by the processor, an amount of the medication flavoring and an amount of the reconstitution water to include in the composition to be dispensed in response to the determined compositional attribute data and the received dispensing option data. The dispensing options comprise: a composition to be dispensed comprising a medication flavoring; a composition to be dispensed comprising reconstitution water; and a composition to be dispensed comprising a combination of a medication flavoring and reconstitution water.

A further aspect of the present invention is to provide a computer-readable memory storage device comprising instructions for determining an amount of medication flavoring to include in a composition to be dispensed by a dispensing apparatus. The instructions when executed by an electronic computer processor cause the processor to receive indicia data associated with at least one medication, determine compositional attribute data associated with the medication in response to the received indicia data, receive data representing at least one dispensing option associated with the composition to be dispensed by the dispensing apparatus, and determine an amount of the medication flavoring and an amount of the reconstitution water to include in the composition to be dispensed in response to the determined compositional attribute data and the received dispensing option data. The dispensing options comprise: a composition to be dispensed comprising a medication flavoring; a composition to be dispensed comprising reconstitution water; and a composition to be dispensed comprising a combination of a medication flavoring and reconstitution water.

Another aspect of the present invention is to provide a computer system programmed for determining an amount of medication flavoring to include in a composition to be dispensed by a dispensing apparatus. The system comprises an electronic computer processor; a module programmed for receiving, by the processor, indicia data associated with at least one medication; a module programmed for determining, by the processor, compositional attribute data associated with the medication in response to the received indicia data; a module programmed for receiving, by the processor, data representing at least one dispensing option associated with the composition to be dispensed by the dispensing apparatus; and a module programmed for determining, by the processor, an amount of the medication flavoring and an amount of the reconstitution water to include in the composition to be dispensed in response to the determined compositional attribute data and the received dispensing option data. The dispensing options comprise: a composition to be dispensed comprising a medication flavoring; a composition to be dispensed comprising reconstitution water; and a composition to be dispensed comprising a combination of a medication flavoring and reconstitution water.

These and other aspects of the present invention will be more apparent from the following description.

BRIEF DESCRIPTION OF THE DRAWINGS

FIG. 1 is an isometric view of an automatic flavoring and water dispensing system in accordance with an embodiment of the present invention.

FIG. 2 is a front view of the automatic flavoring and water dispensing system of FIG. 1.

DETAILED DESCRIPTION

The present invention provides automatic dispensing systems for multiple types of fluids. In one embodiment, the automatic dispensing system is used to deliver different types of flavorings and water for use in liquid medications. The system may provide automated reconstitution of medications, automated flavoring of medications and/or combinations thereof. However, it is to be understood that the automatic dispensing systems of the present invention may be used to deliver various other types of fluids in addition to, or in place of, medicine flavorings and water. For example, multiple flavorings may be provided for other products such as beverages, flavored water, soda, mixed alcoholic or non-alcoholic drinks, food, and the like. In other embodiments, the fluids to be delivered may include different types of liquids such as fragrances, oils, solvents, alcohol, diluents, slurries, pastes, suspensions, and the like. In various embodiments, water may be dispensed as part of the automatic dispensing system. In other embodiments, water may not be dispensed by the system.

Figure 3:
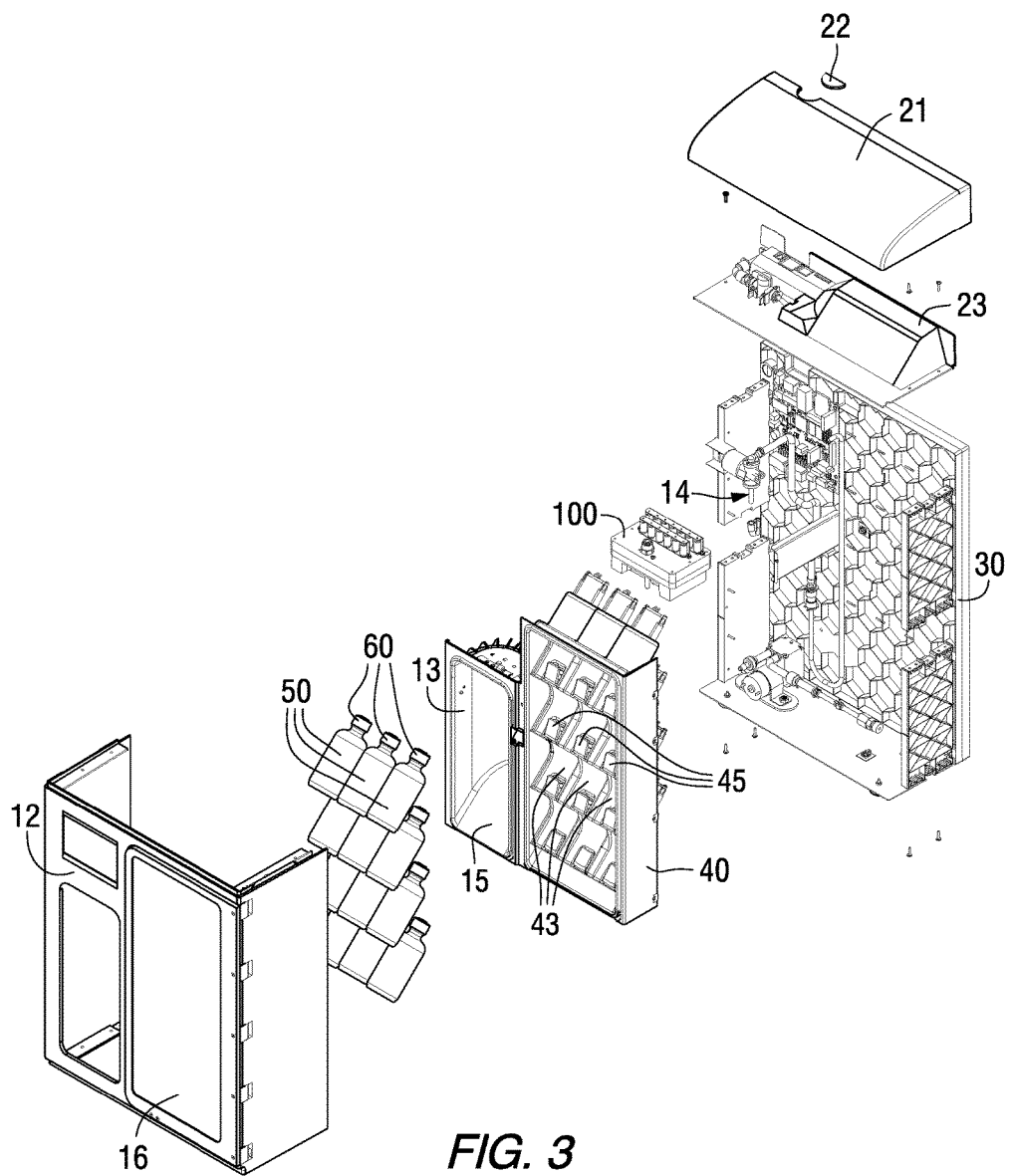
FIG. 3 is an exploded isometric view of the automatic flavoring and water dispensing system of FIG. 1.

Referring to the drawings, an embodiment of an automatic flavoring and water dispensing system 10 is shown in FIGS. 1-3. The automatic flavoring and water dispensing system 10 includes a cabinet 11 with a front panel 12. A recessed filling station 13 is provided in the front panel 12. A flavoring and water dispensing nozzle assembly 14 is provided in the recessed filling station 13. In the embodiment shown, the recessed filling station 13 has a sloped bottom floor 15 rather than a horizontal bottom floor. Such an arrangement requires an operator to manually hold a container (not shown) under the dispensing nozzle assembly 14 during filling operations. However, a non-sloped bottom floor could alternatively be used. As shown in FIGS. 1 and 2, the cabinet 11 includes a top panel 21 with an access cap 22 that may be formed as a knock-out tab that can be removed, e.g., for water and/or electrical supply lines, when the unit is wall-mounted. As shown in FIG. 3, a top subassembly 23 may be used to support the top panel 21. The cabinet 11 also includes a right side panel 24, left side panel 25, and bottom panel 26. As further shown in FIG. 3, the automatic flavoring and water dispensing system 10 includes a frame 30 upon which various components of the dispensing system 10 may be mounted.

As shown in FIGS. 1-4, the automatic flavoring and water dispensing system 10 includes multiple flavoring containers 50 supported by a container rack 40. As shown in FIGS. 1-3, the dispensing system 10 houses multiple flavoring containers 50 accessible through the access door 16 in the front panel 12. In the embodiment shown, twelve flavoring containers 50 are housed in the dispensing system 10. However, any other suitable number of containers and/or cartridges may be used in accordance with the present invention. The flavoring containers 50 may contain various liquid flavor compositions commercially available from FLAVORx, Inc. As more fully described below, the flavoring containers 50 are held at an angle inside the dispensing system in order to facilitate extraction of the entire amount of liquid flavoring from each container 50 as it is emptied during operation of the system.

Figure 4:
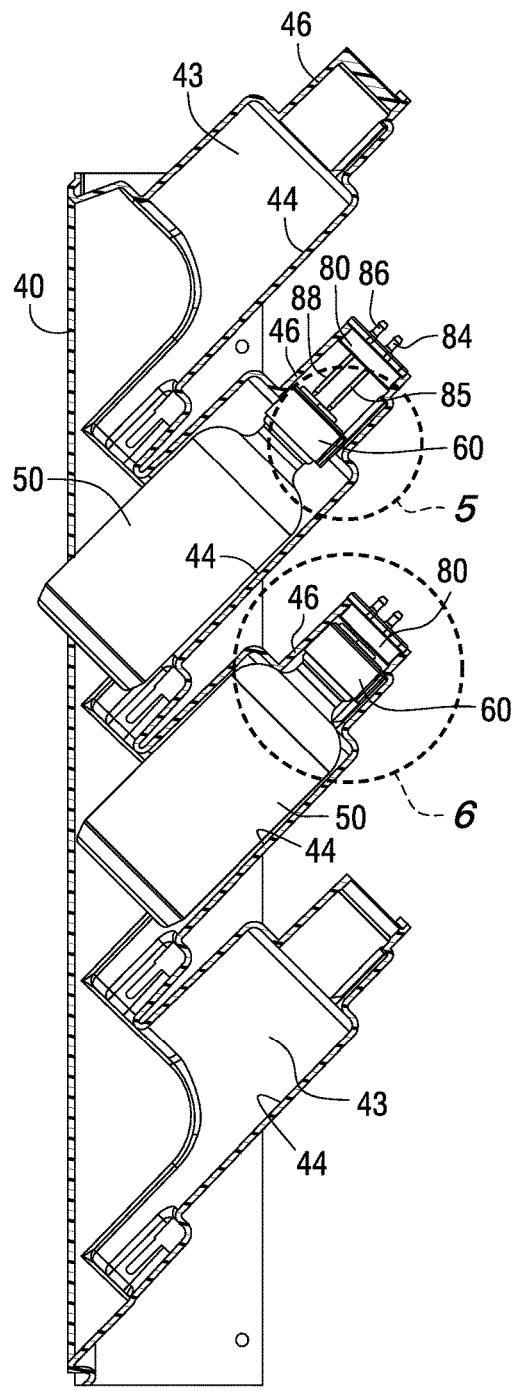
FIG. 4 is a side sectional view of a rack for holding flavoring containers in a dispensing system in accordance with an embodiment of the present invention.

As shown most clearly in FIGS. 3 and 4, the rack 40 includes an array of cradles 43 for holding the flavoring containers 50 in accordance with an embodiment of the invention. As used herein, the term "cradle" means any structure capable of supporting or holding a flavoring container, including horizontal or non-horizontal shelves, brackets, saddles, clips, hangers and the like. Each cradle 43 in the embodiment shown includes an angled side surface 44 and a spring biased support clip 45 for releasably supporting a flavoring container 50 in a desired orientation in the cradle 43, as more fully described below.

Each flavoring container 50 has a body 52 and a neck opening 54, which may be externally threaded. As further shown in FIGS. 3 and 4, a cap 60 is removably fastened on each flavoring container 50, e.g., by means of internal threads. As shown in detail in FIGS. 4-8, the cap 60 is generally cylindrical with a top face 61 and an alignment rib 62 radially projecting from a side wall of the cap 60 in a direction parallel with a longitudinal axial direction of the generally cylindrical cap 60. The cap 60 further includes a flavoring outlet port 64 with a central seal 65, and an air pressure inlet port 66 with a seal 67. While a container 50 and cap 60 arrangement is shown, cartridges may be used in place of the containers. In each case, the containers or cartridges may be single-use or reusable.

Figures 7, 8:
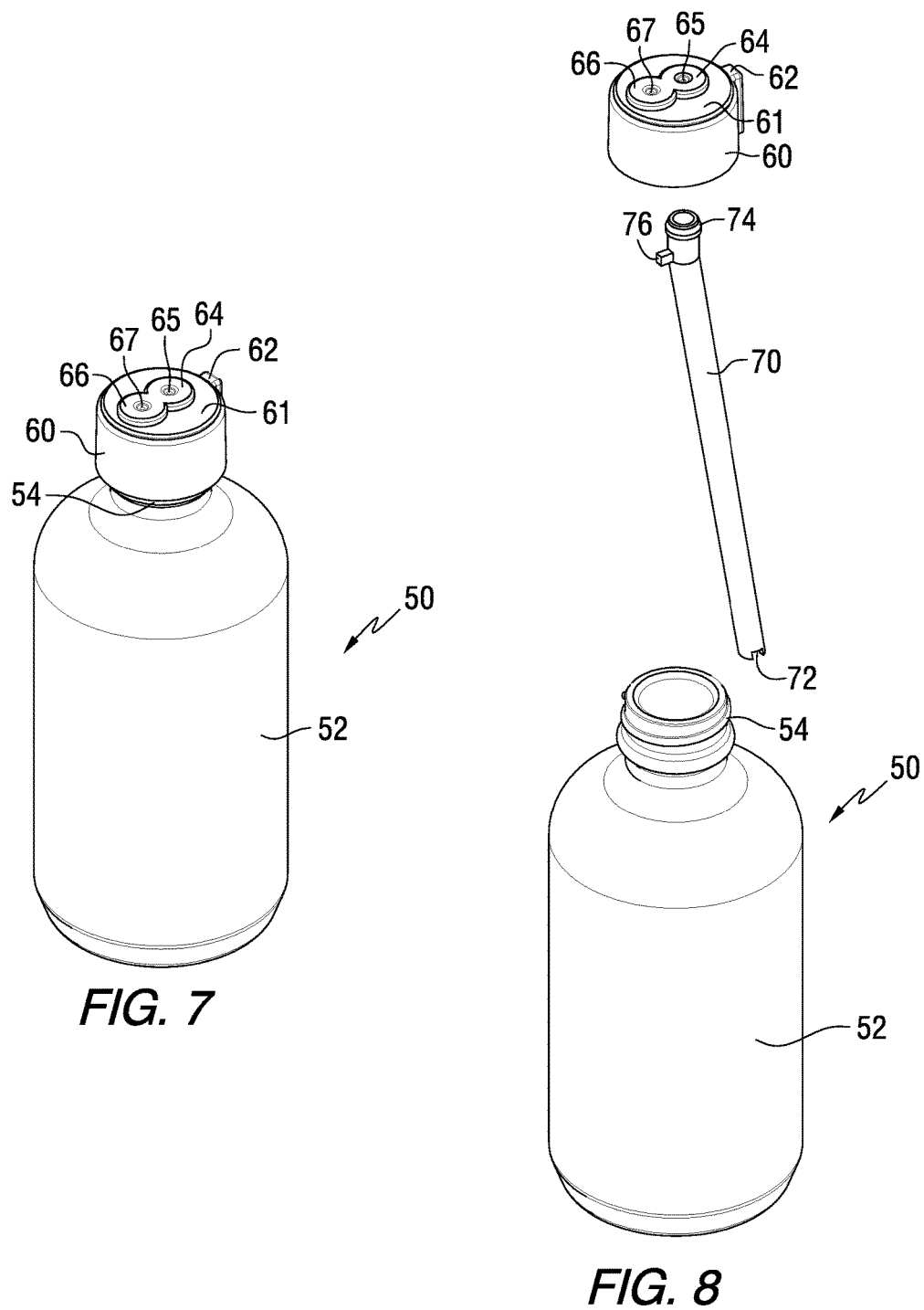
FIG. 7 is an isometric view of a flavoring container and cap in accordance with an embodiment of the present invention.
FIG. 8 is an exploded view of the flavoring container and cap of FIG. 7.

As shown in FIG. 8, a flavoring extraction tube 70 with a bottom notched opening 72 and a top fitting 74 may be releasably attached to the cap 60 such that the flavoring extraction tube 70 is in flow communication with the flavoring outlet port 64. An alignment tab 76 is provided near the top fitting 74 in order to ensure that the flavoring extraction tube 70 is mounted in a desired rotational position in the cap 60. As further shown in FIG. 8, the flavoring extraction tube 70 is provided at an angle such that, when inserted into the flavoring container 50, a bottom end of the tube 70 is positioned at a bottom corner of the container body 52 in order to facilitate full emptying of the flavoring container 50 during operation. The bottom notched opening 72 eliminates potential blockage of flavoring liquid as it enters the tube 70, thereby facilitating flow of the flavoring liquid through the extraction tube.

The containers 50 are held at an angle in the container rack 40 which causes the liquid flavorings to flow to a lower corner of each container as the container empties. In the embodiment shown, the angle is about 45° measured from the vertical direction. However, any other suitable angle may be used, e.g., from 20° to 70°, or from 30° to 60°. With the extraction tube 70 extending downward from the cap 60 and its inlet end positioned at or near the lowest point in the container 50, access to substantially all of the flavoring liquid is provided as the container is emptied. The extraction tube 70 may be made of any suitable material that remains stable in the presence of the various liquid flavors, such as low density polyethylene or the like. The cap 60 may be sealed to the container 50 by any suitable means, such as a silicone seal or the like that engages with the upper edge of the neck opening 54 of the container 50.

Figure 5:
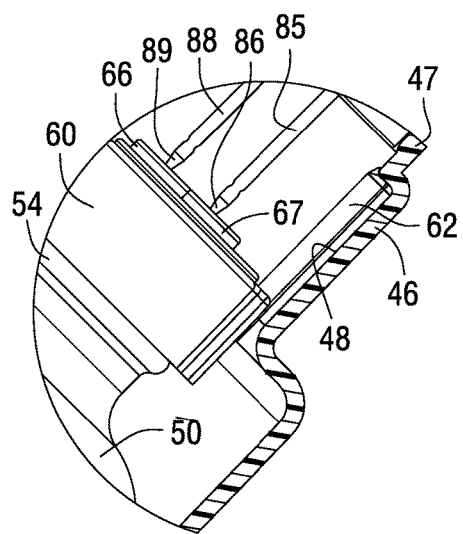
FIG. 5 is an enlarged view of a portion of FIG. 4 showing details of insertion of a flavoring container and cap into a cradle of the dispensing system.
Figure 6:
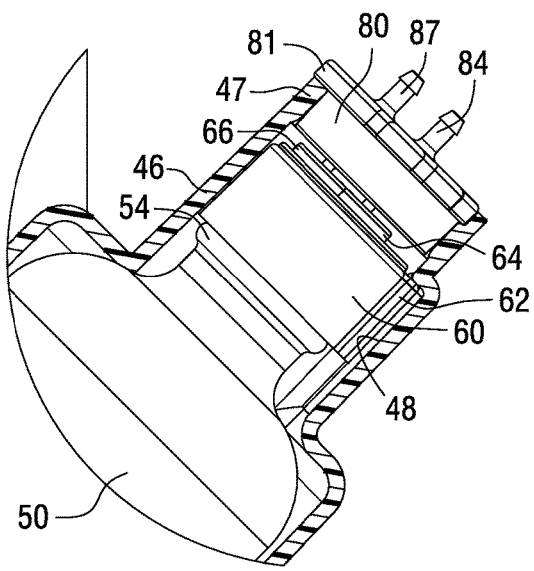
FIG. 6 is an enlarged view of another portion of FIG. 4 showing a flavoring container and cap in an inserted position in a cradle of the dispensing system.

As shown in FIGS. 4-6, a needle tube housing 80 is mounted in the upper portion 47 of the container cap recess 46. As shown in FIG. 4, and the enlarged views of FIGS. 5 and 6, each cradle 43 of the container rack 40 includes a container cap recess 46 for receiving the cap 60 of a flavoring container 50. The container cap recess 46 includes an upper portion in which a needle tube housing 80 is mounted. An alignment groove 48 in the container cap recess receives the alignment rib 62 of a container cap 60. The needle tube housing 80 has a generally cylindrical body with a radially extending flange 81 at a top portion thereof. A flavoring outlet fitting 84 is mounted on, and extends through, the flange 81. An air pressure inlet fitting 87 is also mounted on, and extends through, the flange 81. As shown most clearly in FIGS. 4 and 5, a flavoring outlet needle tube 85 having a needle tip 86 is connected to the flavoring outlet fitting 84, while an air pressure inlet needle tube 88 having an air pressure inlet needle tip 89 is connected to the air pressure inlet fitting 87. Each of the tubes 85 and 88 include an internal passageway terminating before the needle tips 86 and 89 at the lower ends thereof. Two side outlet ports extend through the radial walls of each of the tubes 85 and 88, just above their tips 86 and 89. As more fully described below, the flavoring outlet needle tube 85 and tip 86 are arranged to pierce through the seal 65 of the flavoring outlet port 64 when the cap 60 is installed adjacent to the needle tube housing 80. In a similar manner, the air pressure inlet needle tube 88 and tip 89 are arranged to pierce through the seal 67 of the air inlet pressure port 66 when the cap 60 is installed adjacent to the needle tube housing 80.

In accordance with an embodiment of the invention, the container rack 40, flavoring containers 50, caps 60 and needle tube housings 80 are structured and arranged in a manner that aligns each flavoring container 50 in its respective cradle 43 in a specific orientation that aligns the cap 60 with the flavoring extraction tube 70, and also places the bottom 72 of each flavoring extraction tube 70 at the lowermost position in each flavoring container 50. The cap 60 of each flavoring container 50 is aligned in its respective container cap recess 46 by inserting the alignment rib 62 of the cap in the alignment groove 48 of the recess 46. In this manner, the cap 60 can only fit in the recess 46 in a single orientation that aligns the flavoring outlet port 64 and air inlet port 66 with their corresponding flavoring outlet needle tube 85 and air pressure inlet needle tube 88 of the needle tube housing 80, as shown in detail in FIGS. 5 and 6.

FIGS. 9-19 illustrate a valve assembly 100 and component parts thereof that may be used in the automatic flavoring and water dispensing system 10 in accordance with an embodiment of the present invention. Although the valve assembly 100 is primarily described herein for use in an automatic flavoring and water dispensing system 10, it is to be understood that the valve assembly 100 can also be used in any other suitable system for delivery of various types of fluids. In the embodiment shown, the control valve assembly 100 has thirteen channels, including twelve flavor channels and one water and/or air purge channel.

Figure 10:
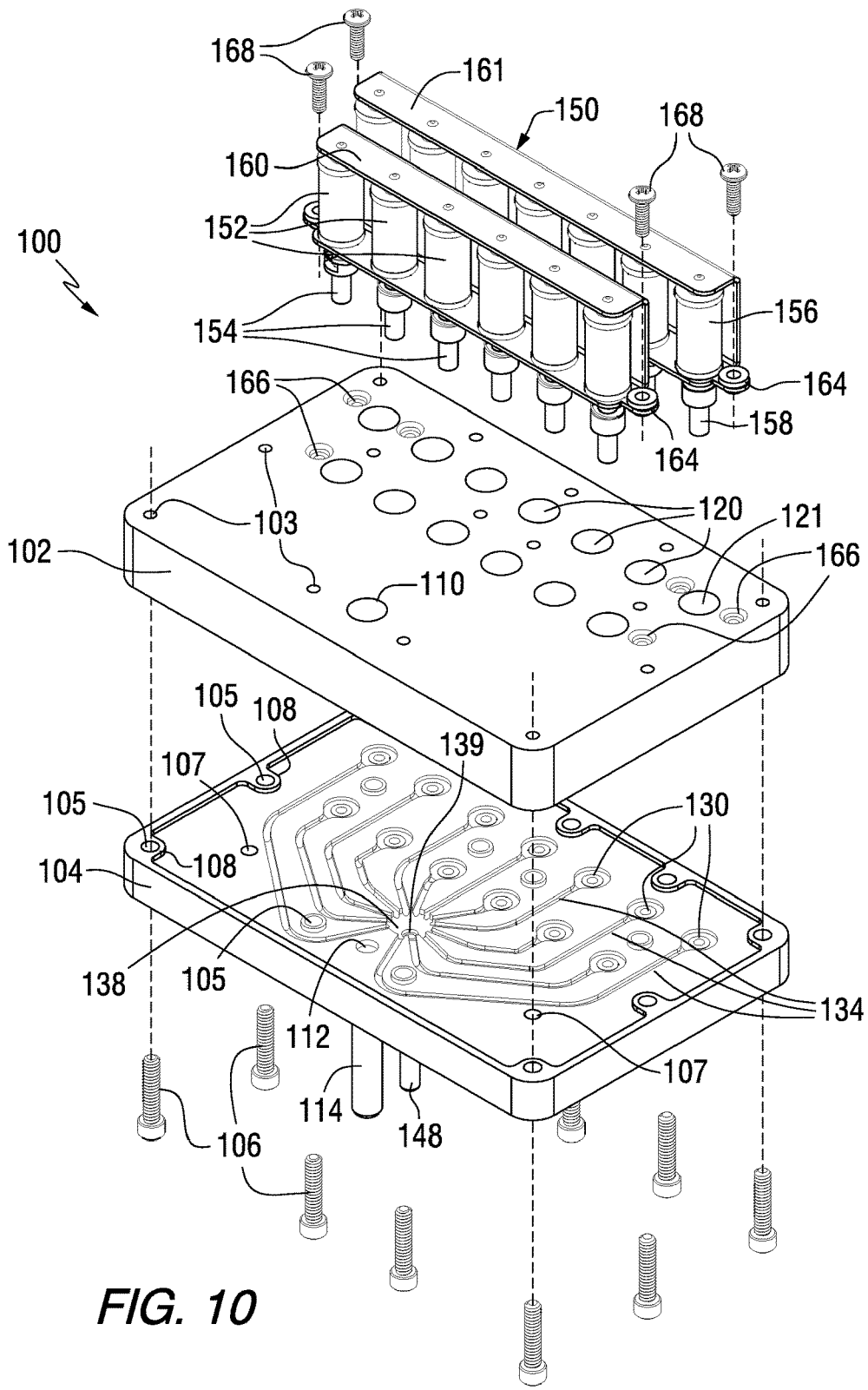
FIG. 10 is an exploded top isometric view of the valve assembly of FIG. 9.

The valve assembly 100 includes an upper valve block 102 and a lower valve block 104. The upper and lower valve blocks 102 and 104 are fastened together by means of attachments holes 103 extending through the upper valve block 102 that are aligned with attachment holes 105 extending through the lower valve block 104. In the embodiment shown, the attachment holes 103 in the upper valve block 102 are threaded, and the attachment holes 105 through the lower valve block 104 are unthreaded. Threaded fasteners 106 extend through the lower valve block attachment holes 105 and are threaded into the upper valve block attachment holes 103. However, any other suitable type of mechanical fasteners or other attachment means may be used. As shown in FIG. 10, threaded mounting holes 107 in the lower valve block 104 may be used to fasten the valve assembly 100 to the frame 30 of the dispensing system 10.

Figure 13:
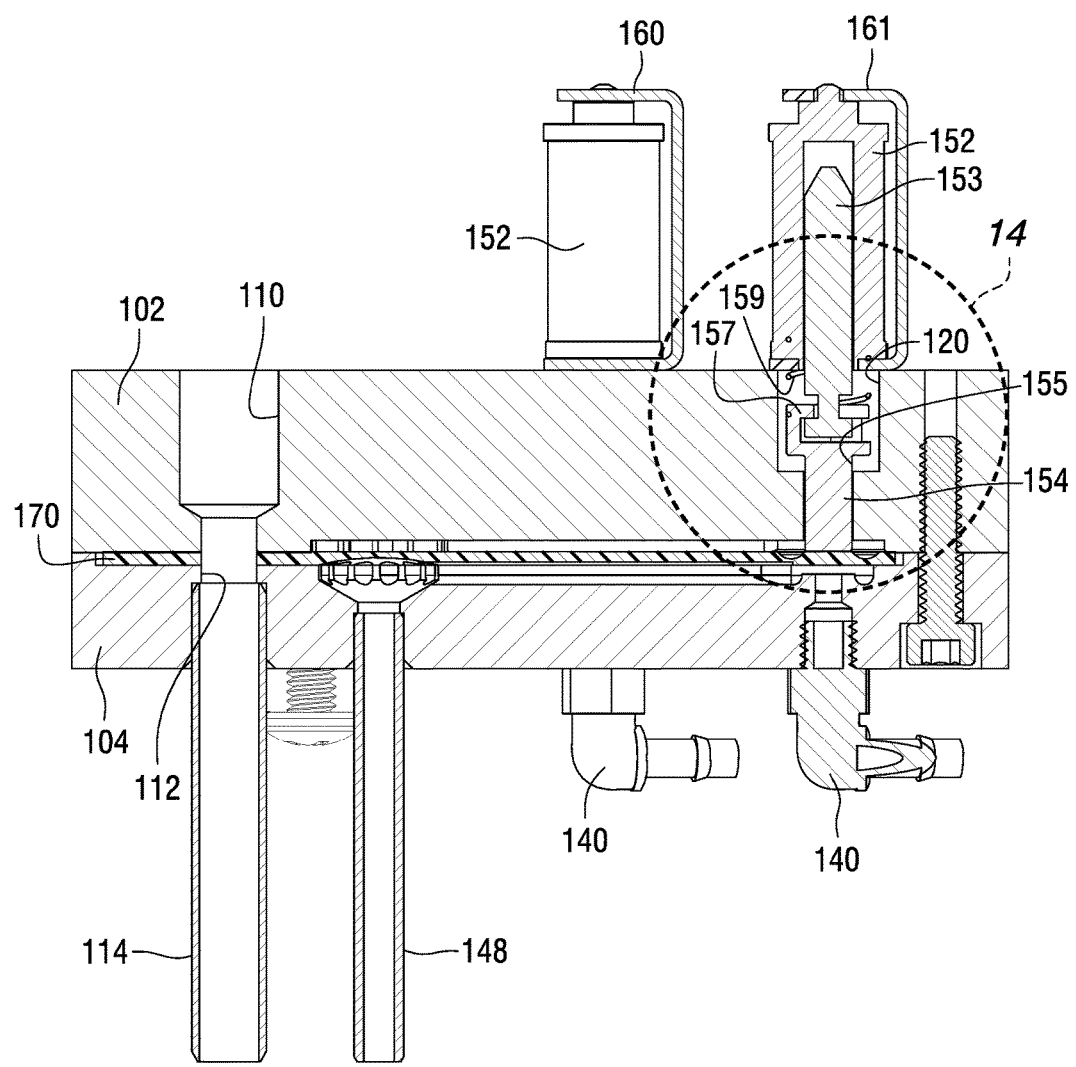
FIG. 13 is a sectional view taken through section 13-13 of FIG. 12.
Figure 20:
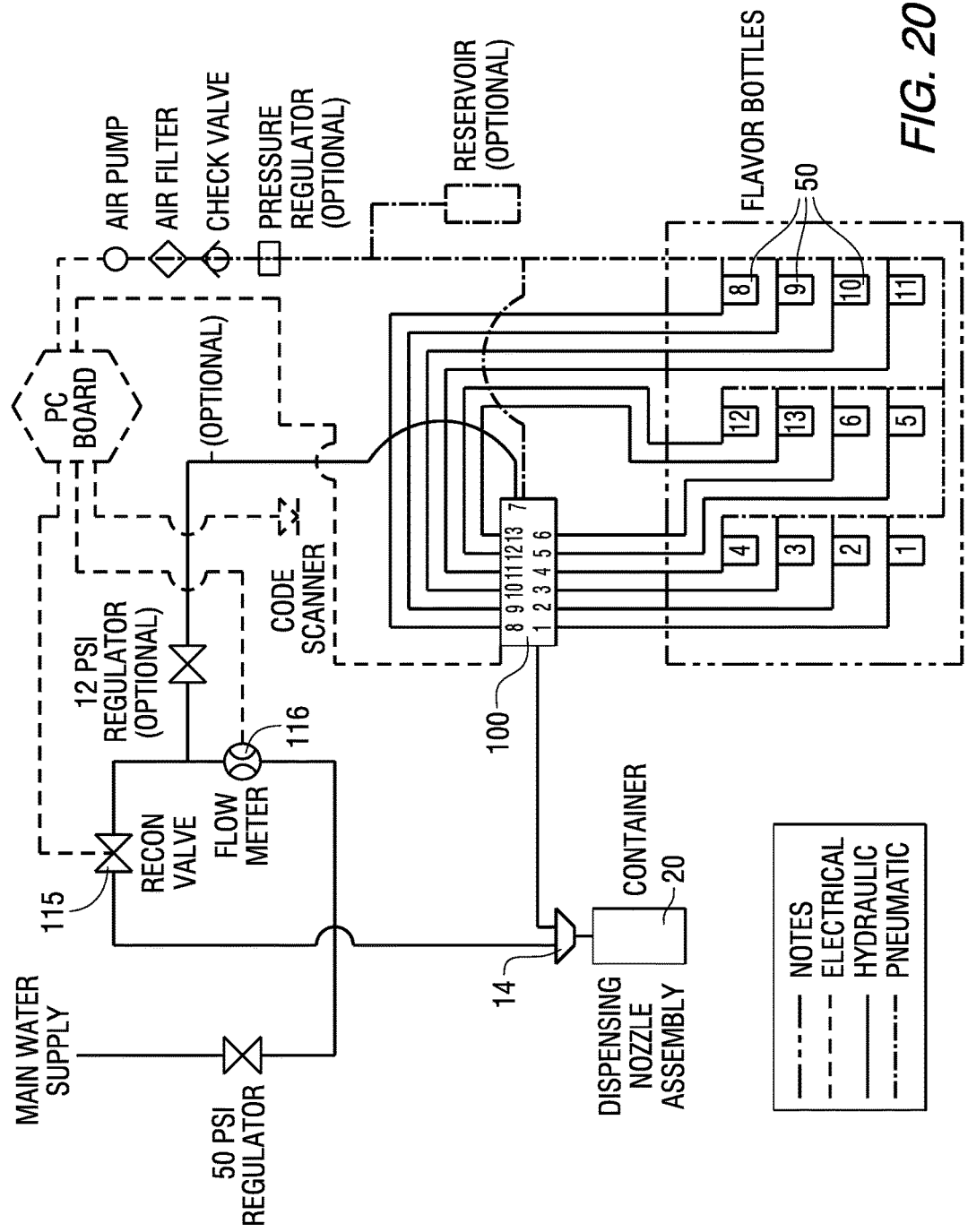
FIG. 20 is a schematic diagram illustrating electrical, hydraulic and pneumatic systems of fluid delivery systems of automatic flavoring and water dispensing systems in accordance with embodiments of the present invention.
Figure 21:
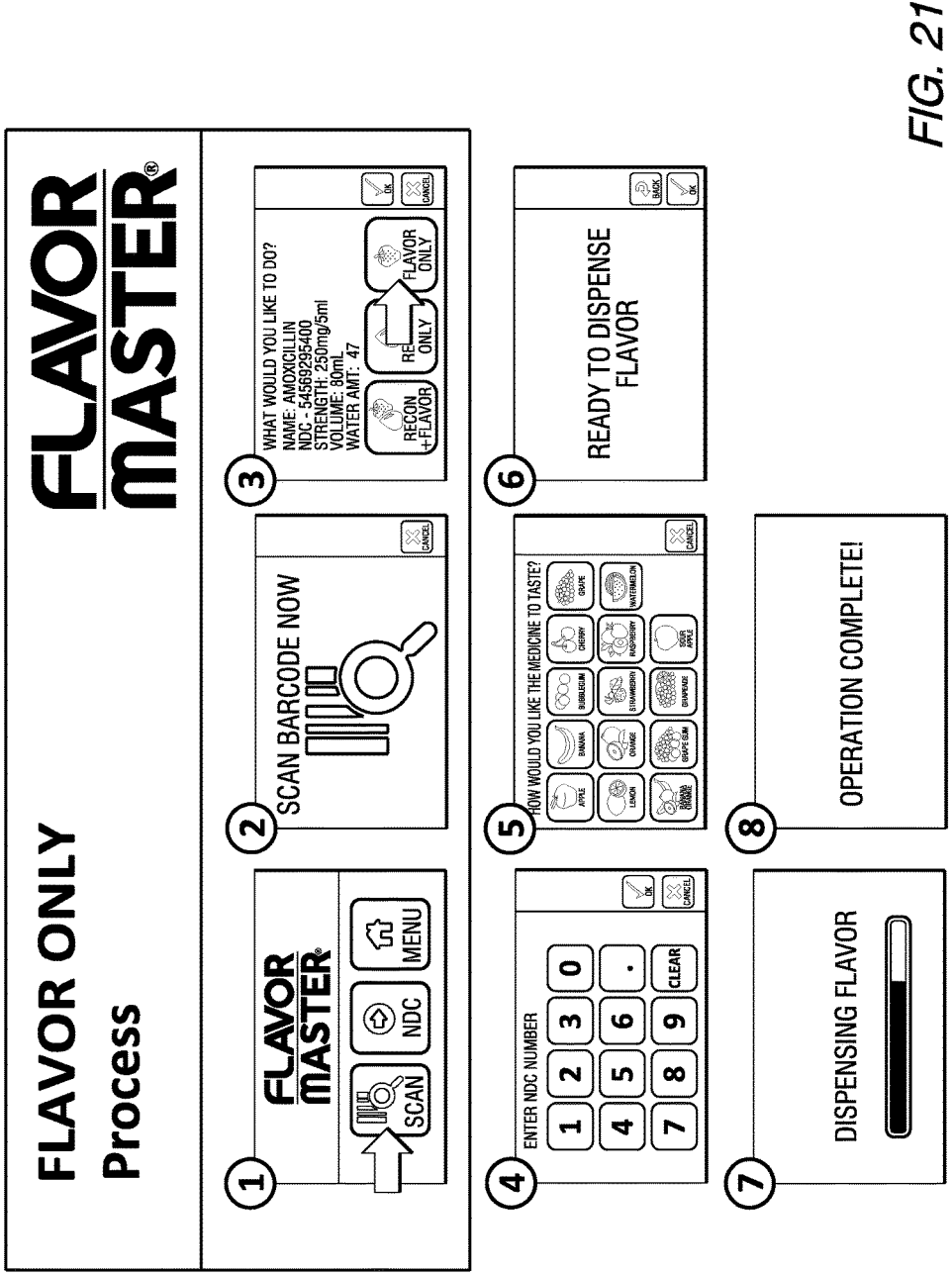
FIGS. 21-23 illustrate user interfaces for operation of an automatic flavoring and water dispensing system in accordance with an embodiment of the present invention, including flavoring operations, reconstitution operations, and a combination of flavoring and reconstitution operations.

The upper surface of the lower valve block 104 includes valve membrane alignment tabs 108 and valve membrane alignment rings 109, as most clearly shown in FIG. 10 and described in more detail below. As shown in FIGS. 10 and 13, the upper valve block 102 has a water delivery hole 110 extending therethrough that is aligned with a water delivery hole 112 extending through the lower valve block 104. A water delivery tube 114 is mounted in the water delivery hole 112 of the lower valve block 104. The water delivery hole 110 may be equipped with a standard fitting (not shown) for connection to a water reconstitution valve 115, which is schematically shown in FIGS. 20 and 21, as described in more detail below.

Figure 17:
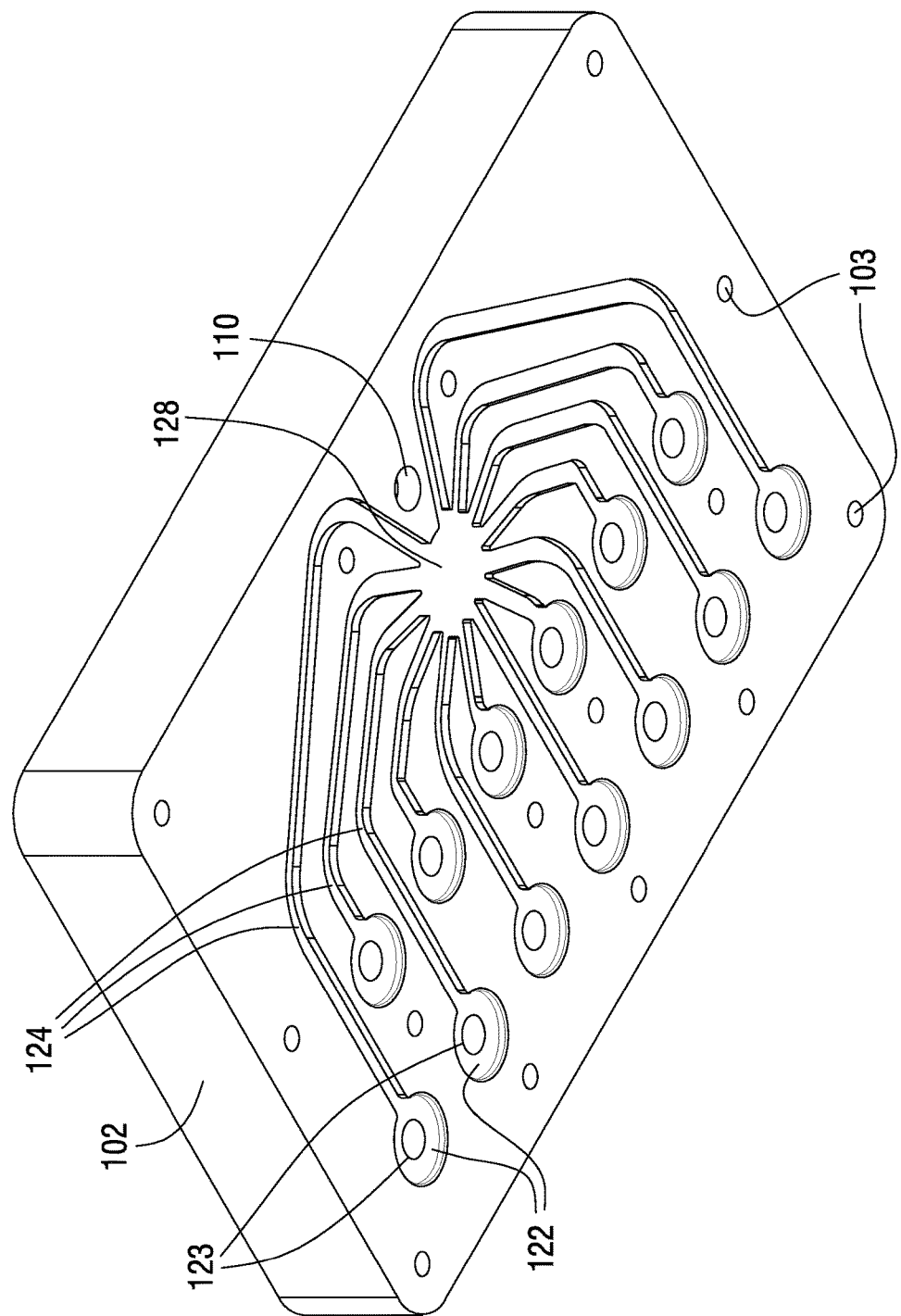
FIG. 17 is a bottom isometric view of an upper valve block of a valve assembly in accordance with an embodiment of the present invention.

As further shown in FIGS. 10 and 13, the upper valve block 102 has several upper solenoid valve receiving holes 120 extending therethrough. Each upper solenoid valve receiving hole 120 has a larger diameter at the top surface of the upper valve block 102 that transitions to a smaller diameter opening 123 near the bottom surface of the upper valve block 102. An annular recess 122 surrounds the lower solenoid plunger receiving hole 123 at the bottom surface of the upper valve block 102. As shown in FIG. 17, several relief channels 124 connected to a relief recess 128 are provided on the bottom surface of the upper valve block 102 in communication with the annular recesses 122. The relief channels may provide alignment of the valve membrane 170 and may allow space for the valve membrane 170 to expand when the channels 130 below are filled with pressurized liquid.

Figure 11:
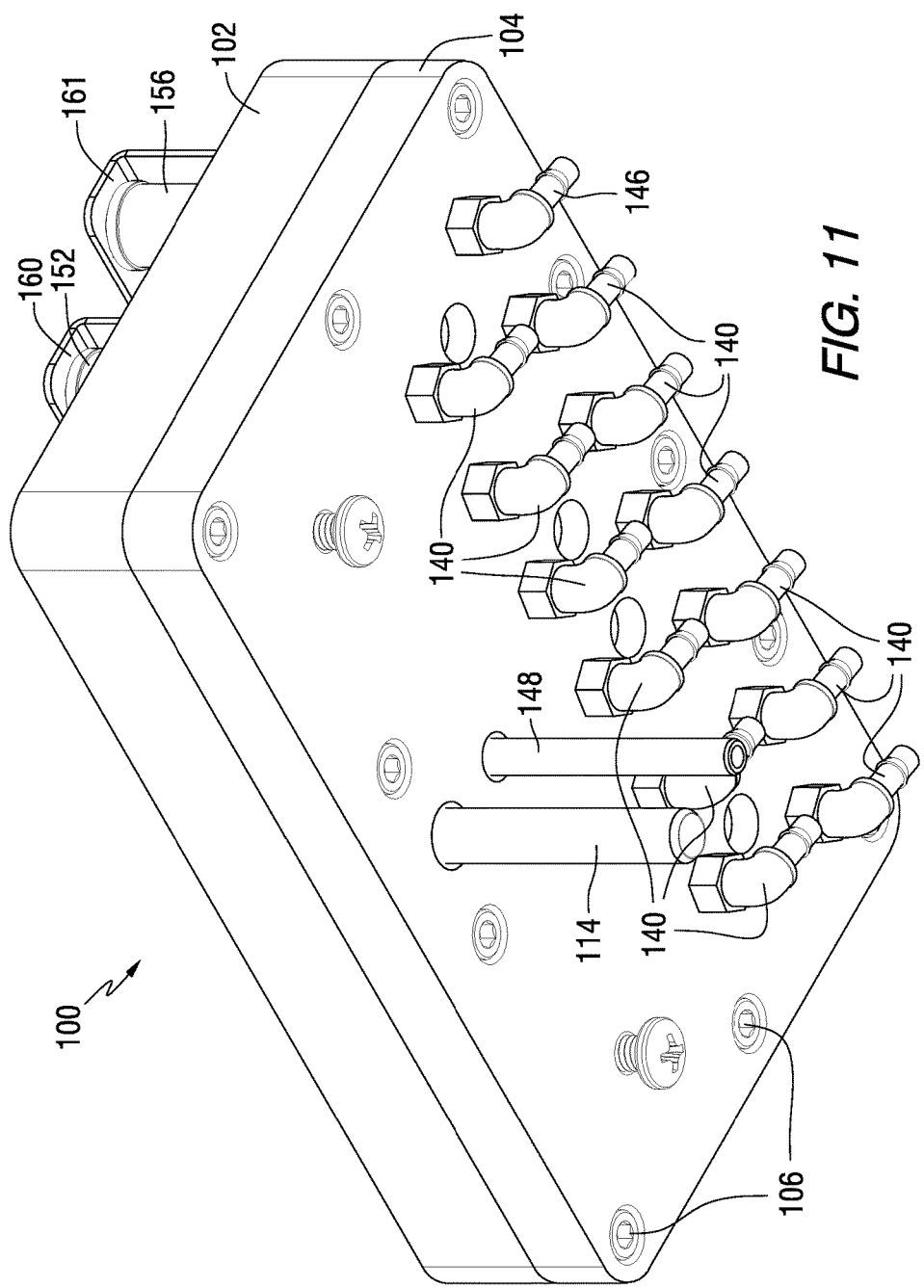
FIG. 11 is a bottom isometric view of the valve assembly of FIG. 9.
Figure 12:
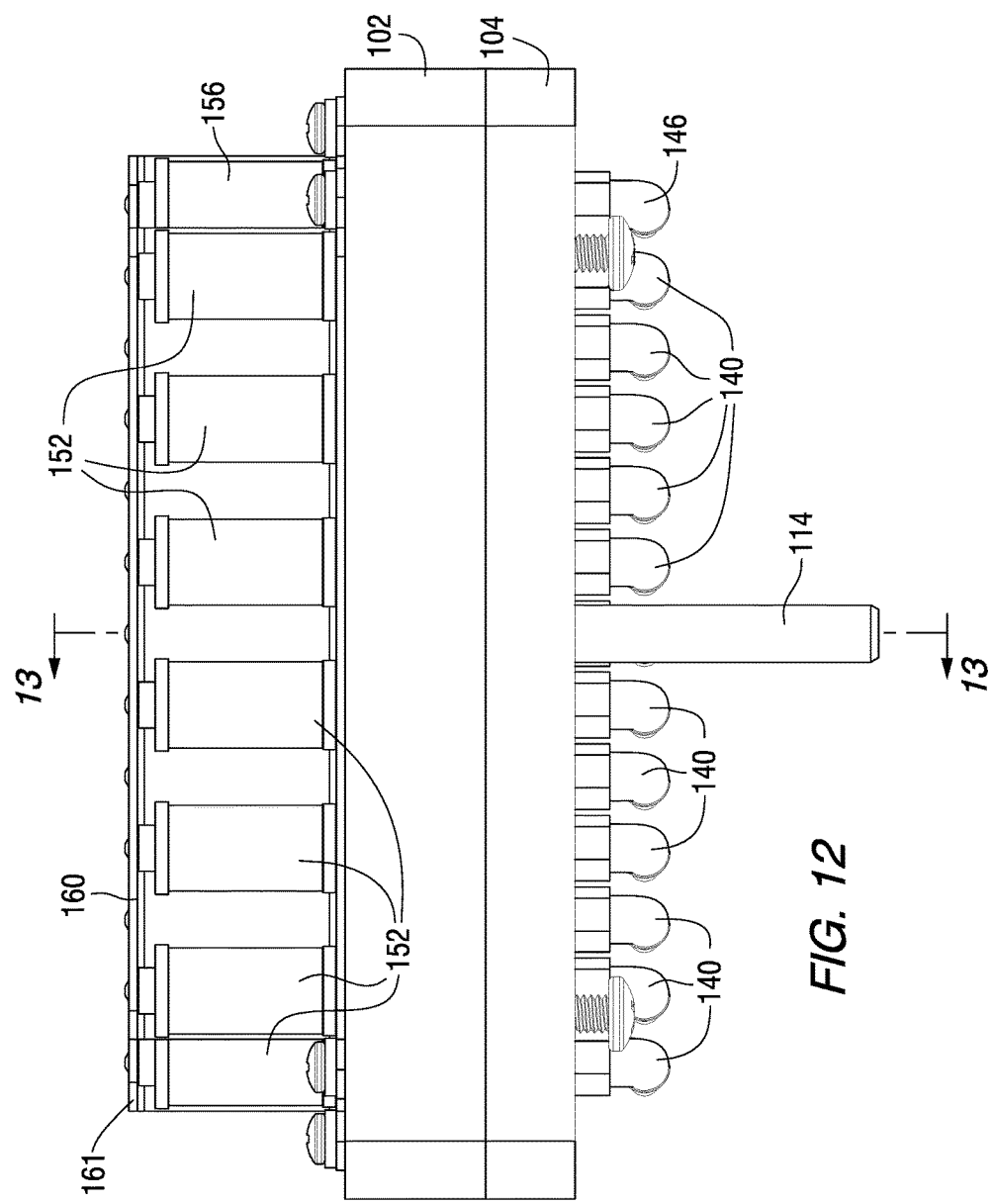
FIG. 12 is a front view of the valve assembly of FIG. 9.

As shown in FIG. 10, the upper surface of the lower valve block 104 includes several valve seat recesses 130 with annular projections 131 radially inside each valve seat recess 130. A fluid delivery hole 132 extends through each annular projection 131, and is in flow communication with a corresponding flavoring delivery tube 140, as shown in FIGS. 11-13. Multiple flavoring tubes 140 deliver flavorings to the fluid delivery holes 132 through the lower valve block 104. In the embodiment shown, a single water delivery tube 146 is provided to one of the fluid delivery holes 132.

As most clearly shown in FIG. 10, multiple fluid delivery channels 134 are provided in the upper surface of the lower valve block 104. Each fluid delivery channel 134 extends from a corresponding valve seat recess 130 and fluid delivery hole 132, and provides a fluid passage toward a fluid delivery manifold 138 having a fluid delivery hole 139. As more fully described below, flavorings supplied through the delivery tubes 140 and water/air supplied through the water/air purge tube 146 flow through the fluid delivery holes 132 into the valve seat recesses 130 and through the fluid delivery channels 134 to the fluid delivery manifold 138. The fluids then travel through the fluid delivery hole 139 into the dispensing nozzle 148. In the embodiment shown, the dispensing nozzle 148 serves to dispense both flavoring mixtures and water therethrough. The water may be provided as part of a reconstitution operation and/or a flushing operation, as more fully describe below.

Figure 9:
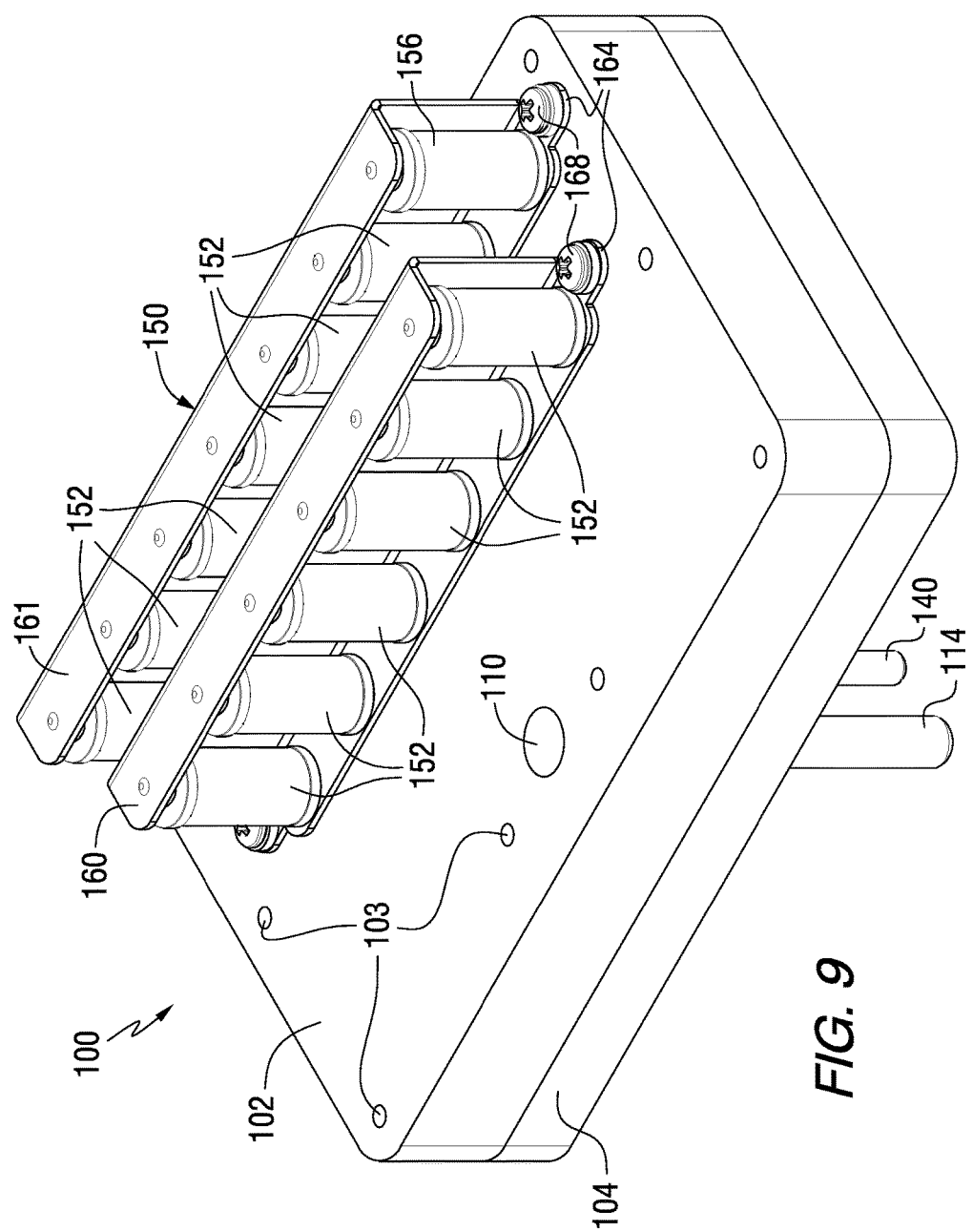
FIG. 9 is a top isometric view of a valve assembly that may be used in an automatic flavoring and water dispensing system in accordance with an embodiment of the present invention.

As shown in FIGS. 9, 10, 12 and 13-15, the valve assembly 100 includes a solenoid valve assembly 150 having multiple solenoids 152 that may be used to control the flow of flavorings in accordance with an embodiment of the invention. In addition, another solenoid 156 may be used to control the flow of water and/or air for purging or cleaning operations in accordance with an embodiment of the invention. The solenoids 152 and 156 are mounted on the upper valve block 102 by means of first and second solenoid mounting brackets 160 and 161. As shown in FIGS. 9 and 10, the first and second solenoid mounting brackets 160 and 161 include attachment tabs 164 aligned with threaded attachment holes 166 in the upper surface of the upper valve block 120. Threaded fasteners 168 extend through the attachment tabs 164 into the threaded attachment holes 166 in order to fasten the first and second solenoid brackets 160 and 161 onto the upper valve block 102.

Figure 14:
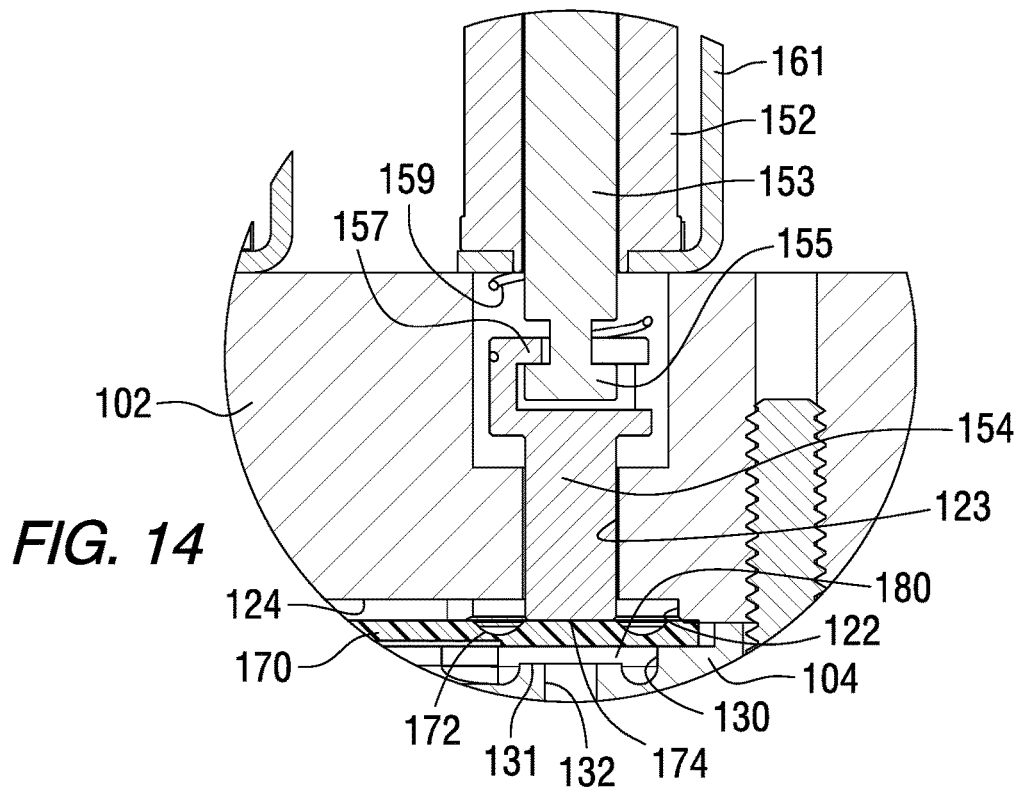
FIG. 14 is an enlarged sectional view of a portion of the valve assembly of FIG. 13 showing details of a solenoid valve assembly with the valve in an open position.
Figure 15:
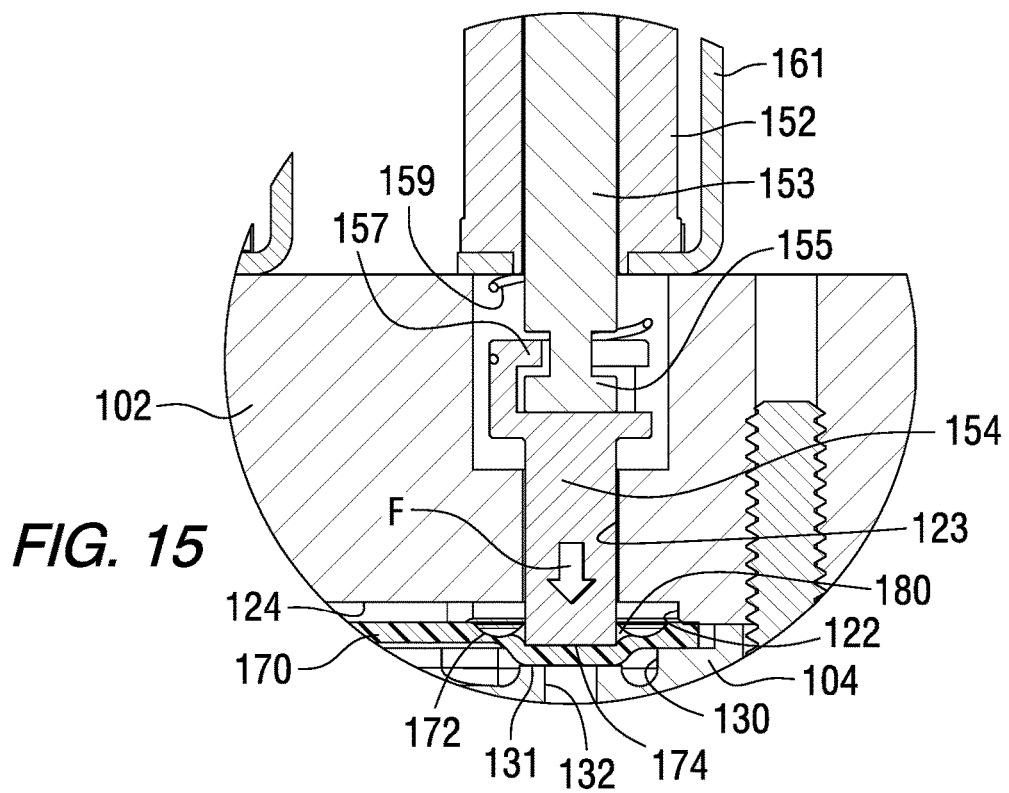
FIG. 15 is an enlarged sectional view of a portion of the valve assembly of FIG. 13 showing details of a solenoid valve assembly with the valve in a closed position.

As shown in FIGS. 13-15, each solenoid 152 has a reciprocating solenoid valve pin 153 slidably mounted therein. The bottom of the solenoid valve pin 153 engages a solenoid valve plunger 154 to control reciprocating axial movement of the solenoid valve plunger 154. A retainer head 155 is provided at the bottom of the solenoid valve pin 153, which is retained in a slotted retainer cage 157 at the top of the valve plunger 154. FIG. 14 illustrates an open position of the solenoid 152 in which the solenoid valve pin 153 and retainer head 155 pull the slotted retainer cage 157 and valve plunger 154 upward against the bias of spring 159. In FIG. 15, the solenoid 152 is in its closed position in which the bias spring 159 presses the slotted retainer cage 157 and solenoid valve plunger 154 downward in the direction of arrow F. The solenoid 156 used for water and/or air purging may have a similar construction as the other solenoid valves, with a solenoid valve plunger labeled 158 in FIG. 10.

Figure 16:
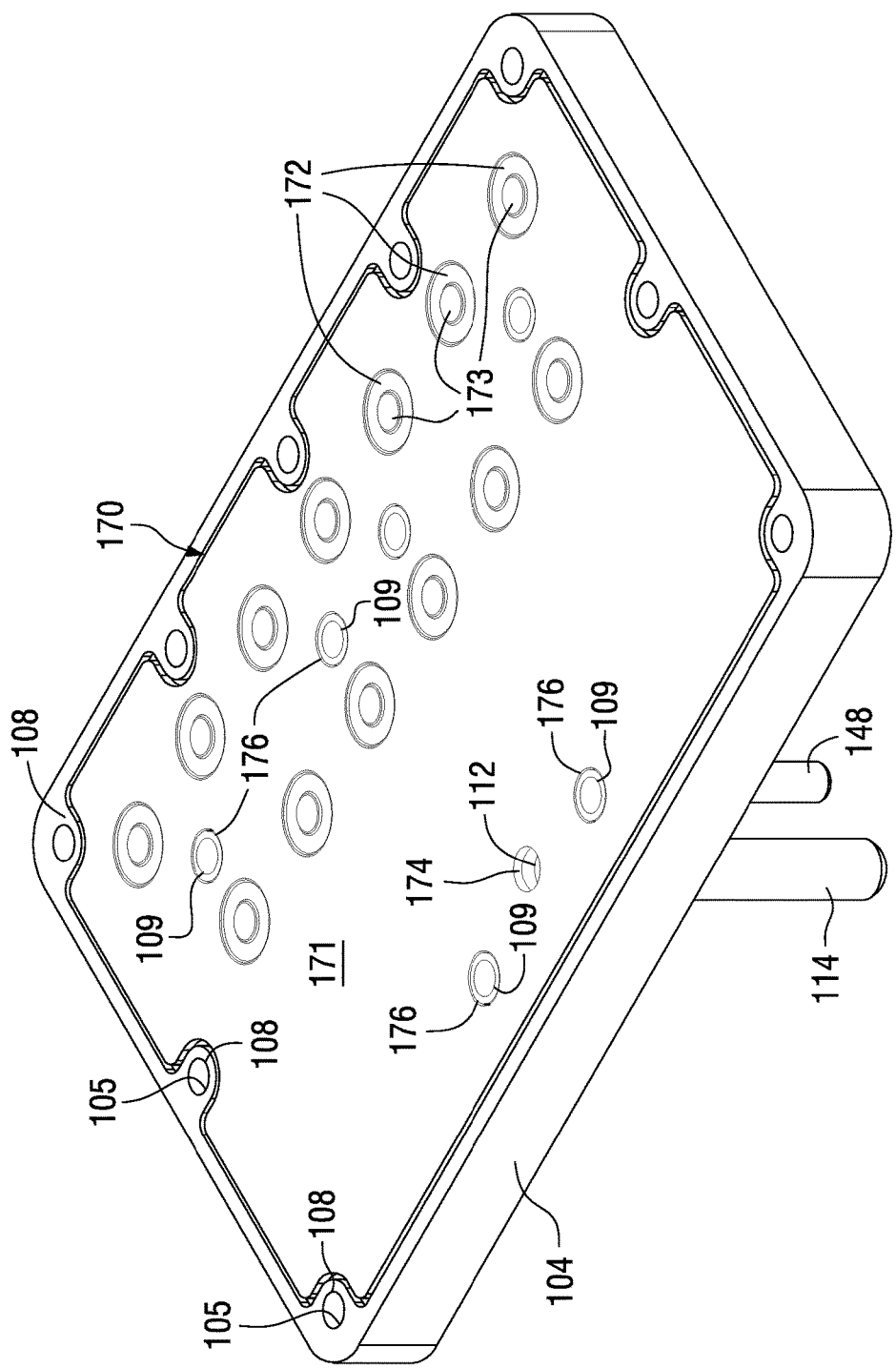
FIG. 16 is a top isometric view of a lower valve block of a valve assembly in accordance with an embodiment of the present invention.
Figure 18:
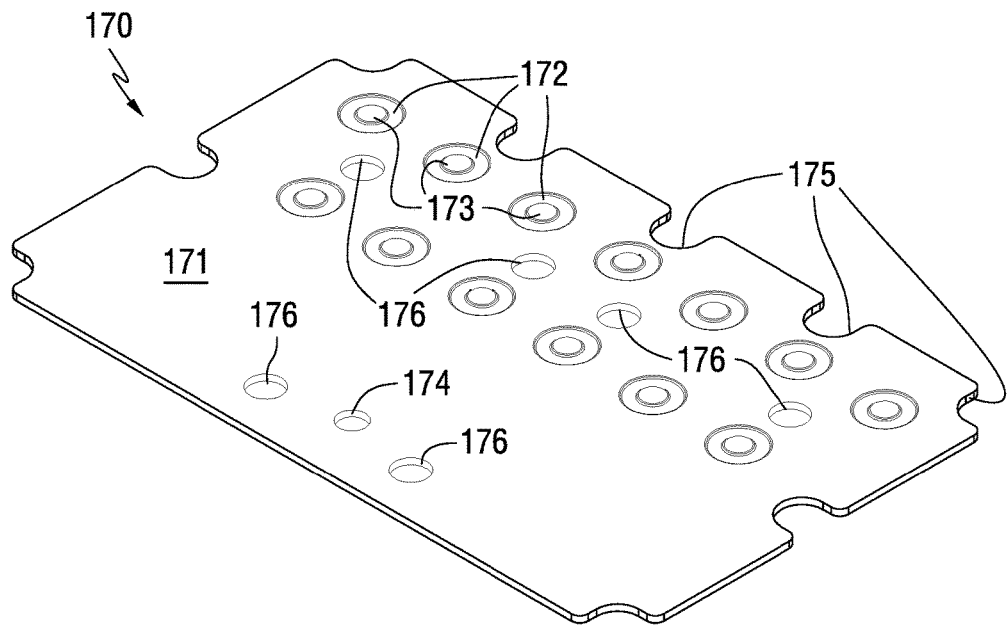
FIG. 18 is a top isometric view and FIG. 19 is a bottom isometric view of a valve membrane for use in a valve assembly in accordance with an embodiment of the present invention.
Figure 19:
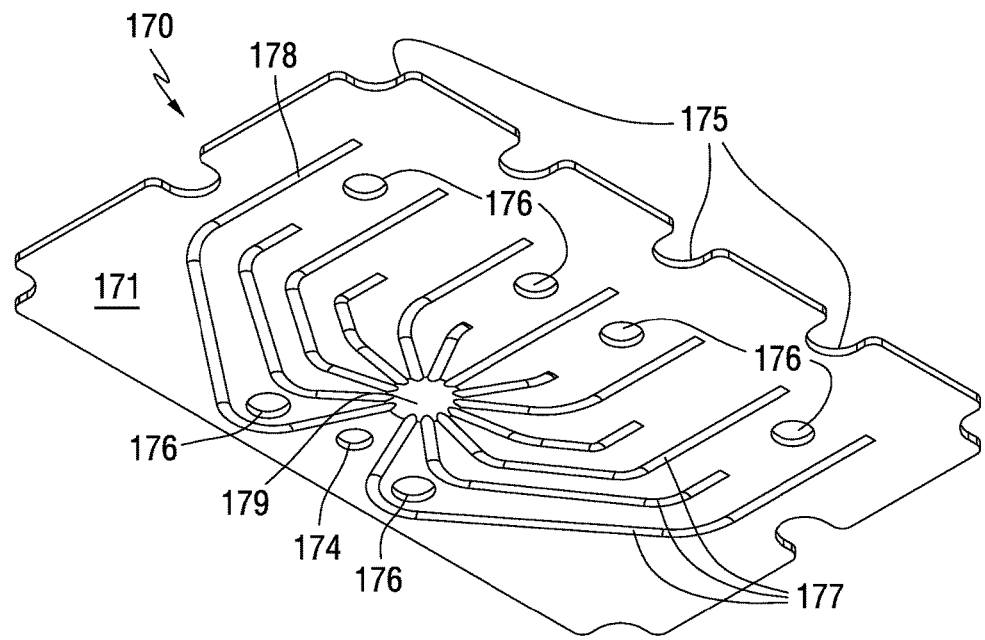

The valve assembly 100 includes a flexible and resilient valve membrane 170 between the upper valve block 102 and lower valve block 104. The valve membrane 170 is shown in FIGS. 13-16, 18 and 19. For purposes of illustration, the valve membrane 107 has been omitted from the exploded view of FIG. 10. FIG. 18 is a top isometric view and FIG. 19 is a bottom isometric view of the valve membrane 170. Installation of the valve membrane 170 on the upper surface of the lower valve block 104 is shown in FIG. 16. The valve membrane 170 comprises a generally planar membrane sheet 171 having multiple annular compliance recesses 172 in its upper surface. Each annular compliance recess 172 includes a contact disk 173 radially inside the recess. The valve membrane 170 is made of a deformable elastic material such as silicone or other elastic polymers.

A water delivery through hole 174 extends through the valve membrane 170. Edge notches 175 are provided at selected locations around the peripheral edge of the valve membrane 170. Alignment holes 176 are provided through the membrane 170 inside the peripheral edge thereof.

As shown most clearly in the bottom isometric view of FIG. 19, the valve membrane 170 includes multiple flavoring delivery channels 177 and a water and/or air purge channel 178. In the embodiment shown, the flavoring delivery channels 177 and purge channel 178 are in flow communication with a flavoring delivery manifold recess 179 that is positioned above the fluid delivery manifold 138 of the lower valve block 104. The flavoring delivery channels 177 of the valve membrane 170 are aligned above corresponding fluid delivery channels 134 in the upper surface of the lower valve block 104. The water/air purge channel 178 of the valve membrane is aligned above one of the fluid delivery channels 134 in the upper surface of the lower valve block 104.

As shown in FIGS. 13-15, each contact disk 173 of the valve membrane 170 is located below a solenoid valve plunger 154 or solenoid valve plunger 158. As shown in FIG. 14, opening of the solenoid 152 by upward movement of the solenoid valve pin 153 and solenoid valve plunger 154 against the force of the bias spring 159 allows the contact disk 173 of the valve membrane 170 to move upward due to the elastic characteristics of the valve membrane material to a position where the valve membrane no longer contacts the annular projection 131. In this position, the fluid delivery hole 132 is no longer blocked, and a fluid passage chamber 180 is provided that allows fluid to flow up through the fluid delivery hole 132, into the valve seat recess 130, and into the fluid delivery channel 134.

In the position shown in FIG. 15, the solenoid valve 152 is in a closed position in which the bias spring 159 presses the solenoid valve plunger 154 downward in the direction of arrow F against the contact disk 173 of the valve membrane. Such downward force F elastically deforms the annular compliance recess 172 of the valve membrane 170 and forces the bottom surface of the contact disk 173 against the annular projection 131, thereby blocking fluid flow from the fluid delivery hole 132 into the annular projection 131 and fluid delivery channel 134.

Each solenoid 152, 156 is thus spring biased into a closed position. When a particular solenoid 152, 156 is activated, it moves to an open position against the spring bias. Opening and closing of the individual solenoids 152, 156 controls the flow of the liquid flavors and water/air purging fluid through the system. For example, the solenoid for one of the flavor channels 134, 177 may be held open for a sufficient amount of time to allow a desired volume of the particular flavor to flow through the valve to the flavoring dispensing nozzle 148 of the system. The flavor supply lines 140 leading into the control valve 100 are pressurized, and the volume of flavoring liquid that passes through the control valve 100 is a function of parameters such as the pressure of the incoming flavoring liquid, the geometry of the valve opening, and the amount of time the valve remains open. The viscosity of the flavoring liquid may also affect its flow, and the viscosity may vary depending on the temperature of the flavoring liquid. The control valve 100 may optionally be provided with a temperature sensor (not shown) that may be used to determine viscosity changes of the various flavoring liquids, and to adjust the valve timing based upon such temperature/ viscosity determinations. An atmospheric pressure sensor (not shown) may also be optionally provided on or near the valve assembly 100.

In certain embodiments, the dispensing system 10 may include a purge or flush mode for removing residual flavorings from the fluid delivery manifold 138 and/or from the fluid delivery channels 134, 177. In the embodiment shown, a purge fluid such as water or air may be supplied through the purge line or tube 146, and the solenoid 156 is used to control water and/or air flow through its corresponding fluid delivery channel 134 in the lower valve block 104 and opposing purge channel 178 in the valve membrane 170, into the fluid delivery manifold 138, and through the flavoring dispensing nozzle 148. In certain embodiments, pressurized air is used to purge or flush any residual flavoring contained in the fluid delivery manifold 138 and the flavoring delivery manifold recess 179. A burst of air may thus be used to clean the system. In this embodiment, the burst of air may be provided via the purge tube 146 from a pressurized air source held at any desired pressure, for example, from 5 to 20 psi, or from 10 to 15 psi. In addition to, or in place of, the use of air to purge the system, water may be used to purge or flush any residual flavorings. In this embodiment, a source of water, e.g., at standard line pressure, may be supplied through the purge tube 146 instead of air. For reconstituted medications, water may be flushed through the system into a medicine container, in which case the amount of flush water may be added to the calculation of the total amount of water to be delivered by the system into the medication bottle. However, for commercially prepared liquid medications, the water may be flushed into waste. The waste water may flow into a waste container, or may alternatively be disposed of through a waste line connected to a drain, etc. In certain embodiments, both air and water may be used to purge or flush the system, in which case an additional channel and control valve (not shown) may be provided in the valve assembly.

In an alternative embodiment to that shown in the figures, the dispensing tip of the nozzle may include a coaxial arrangement in which the flavoring is delivered through a central channel and the water is delivered through a surrounding annular channel. In such an embodiment, the outer diameter of the centrally located flavoring line may taper inwardly on its downstream end, while the inner diameter of the surrounding water line may not taper but instead may be generally cylindrical. This arrangement may slow down the flow rate of the water as it exits the dispensing tip, thereby reducing or eliminating splashing that could otherwise occur.

In certain embodiments, a user of the automatic flavoring and water dispensing system 10 presents a medicine container to the electronic scanner 19 that reads a barcode or any other suitable type of code or indicia that has been applied on or near the container. Once the type of medication has been determined by the scanner 19, or by any other type of automatic or manual input, a digital formulary may be accessed in order to automatically identify possible flavor options for the particular medication, as well as the type and amount of each flavoring to be added to the medication for each flavor option. For example, a digital formulary containing flavor options and flavoring recipes is available from FLAVORx, Inc.

FIG. 20 is a schematic diagram illustrating electrical, hydraulic and pneumatic systems of the fluid delivery system 10 in accordance with embodiments of the present invention. FIG. 20 shows flavor bottles 50, valve assembly 100 and dispensing nozzle assembly 14, as previously described. In addition, FIG. 20 shows a container 20 positioned below the dispensing nozzle assembly 14, which may be a medication container used during flavoring and/or reconstitution operations, or may be a waste container for use during purging or flushing operations. FIG. 20 also shows a valve 115 and a standard flow meter 116 that may be used to control water flow during reconstitution operations. The reconstitution water valve 115 may be of any standard construction known to those skilled in the art such as a commercially available solenoid valve or the like.

The hydraulic system shown in FIG. 20 includes a main water supply, with a pressure regulator that feeds water through the flow meter 116 and into the water reconstitution valve 115, which is used to control the flow of water to the valve assembly 100. Any suitable water pressure may be used, for example, from 5 to 100 psi, or from 20 to 80 psi. In certain embodiments, standard water line pressure may be used. A water line extends from the water reconstitution valve 115 to the water delivery tube 114 of the dispensing nozzle assembly 14. In addition to water inflow from the main water supply, the flavoring outlet port 64 of each flavoring container 50 and cap 60 is connected by a liquid flavoring delivery line to the corresponding flavoring delivery tubes 140 of the valve assembly 100. In FIG. 20, channel Nos. 1-6 and 8-13 are used to indicate each of the twelve flavoring lines, and channel No. 7 indicates a water and/or air purge line that is connected to the valve assembly 100. Flavorings and any water or air exiting the valve assembly 100 flow through a liquid delivery line to the flavoring dispensing nozzle 148 of the dispensing nozzle assembly 14.

The electrical system shown in FIG. 20 includes a PC board connected to the valve assembly 100, the water reconstitution valve 115 and its flow meter 116, and a standard air pump. Programmable equipment such as computers may be used as part of the electrical system, as more fully described below.

The pneumatic system shown in FIG. 20 includes an air pump feeding into an air filter, a check valve, and an optional pressure regulator. In addition, an optional reservoir may be provided. Pressurized air is fed to each of the flavor bottles 50 via the air pressure inlet fitting 87 and inlet needle tube 88 of each of the needle tube housings 80. Any suitable air pressure may be used, for example, from 1 to 100 psi, or from 5 to 20 psi. In addition, pressurized air may optionally be fed to the valve assembly 100 if the valve assembly 100 is equipped for air purging.

Figure 22:
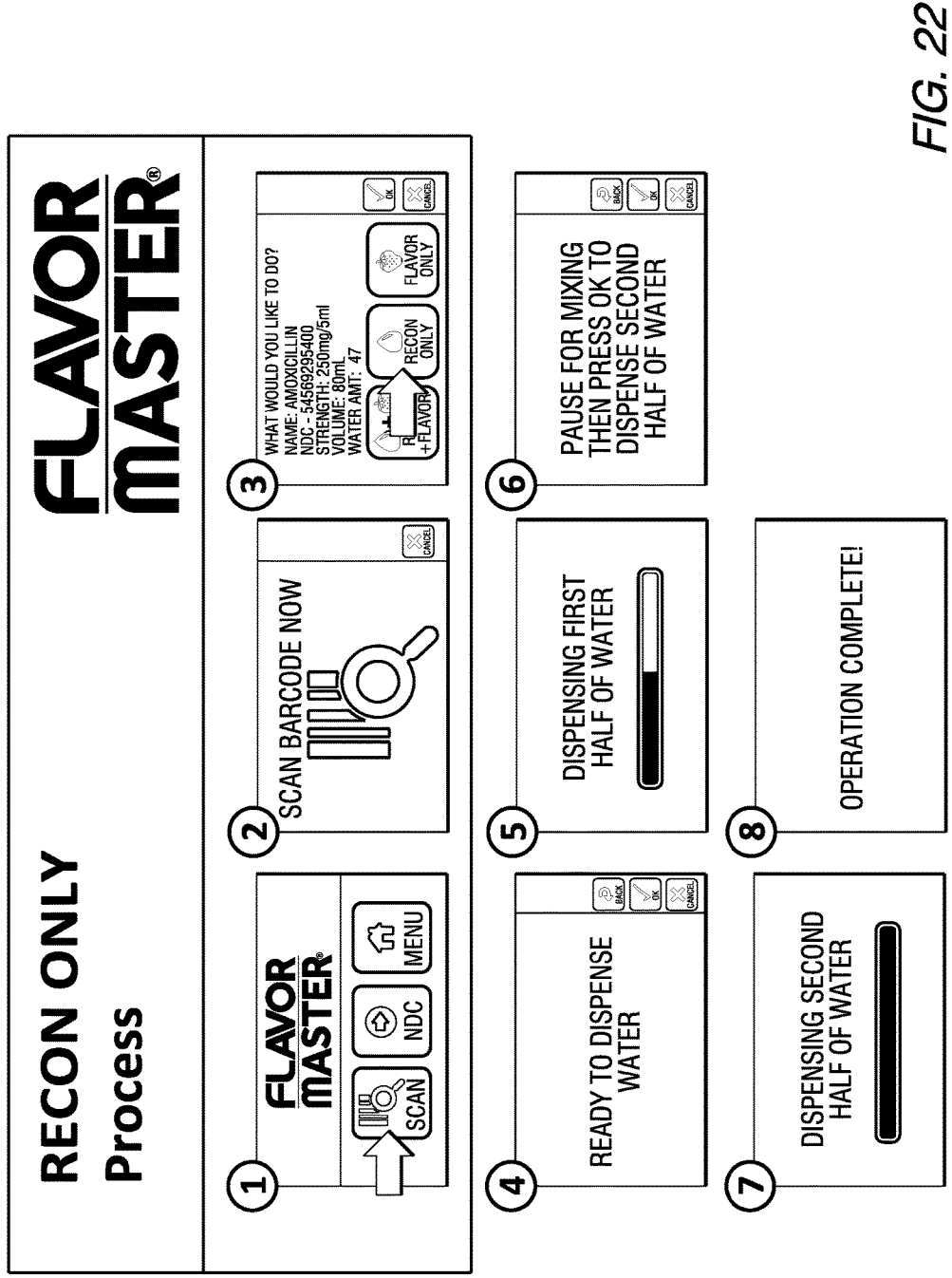
Figure 23:
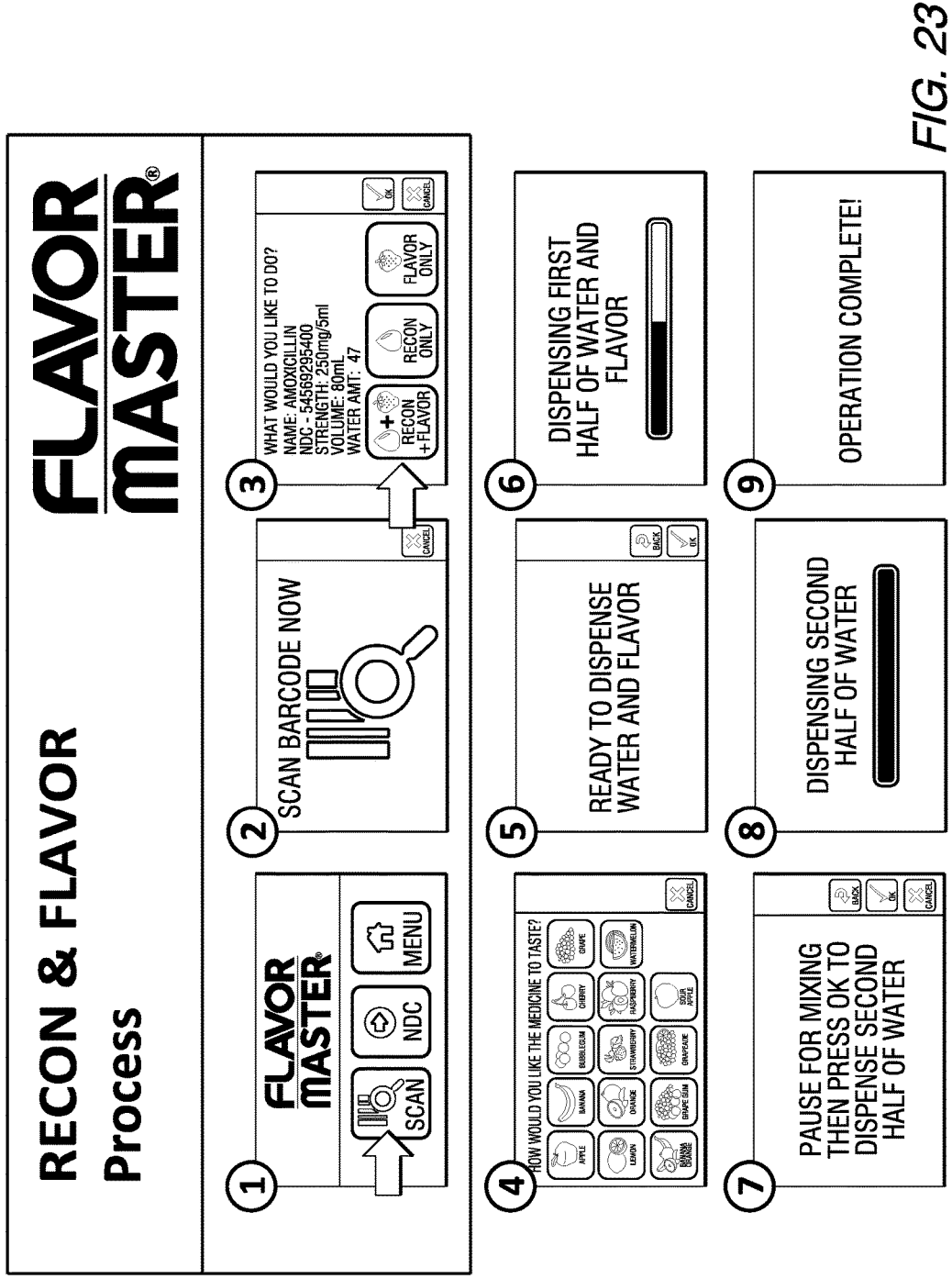

FIGS. 21-23 illustrate the operation of a user interface in accordance with an embodiment of the present invention. FIG. 21 shows a flavor only process. FIG. 22 shows a water reconstitution only process. FIG. 23 shows a combined water reconstitution and flavor process. In the flavor only process shown in FIG. 21, in step 1, a user is presented with an initial screen on the user input and display screen 18, including "scan", "NDC" and "menu" options. If the "scan" option is chosen in step 1, the user is prompted to "scan barcode now" by a display screen presented in step 2. The user may then use the code scanner 19 on the side of the water dispensing system 10 to input information regarding the particular medication to be flavored. After scanning, in step 3, the user is presented with three options: "recon plus flavor", "recon only" and "flavor only". When a user selects the "flavor only" option as shown in FIG. 21, a prompt appears for the user to enter a standard national drug code (NDC) number in step 4. In step 5, the user is asked "how would you like the medicine to taste?", and several flavoring options appear on the screen. In the embodiment shown, the flavoring options include apple, banana, bubblegum, cherry, grape, lemon, orange, strawberry, raspberry, watermelon, banana orange, grape gum, grapeade, and sour apple. As understood by those skilled in the art, each selected flavor may be obtained by reference to a formulary that contains various flavoring recipes, e.g., the digital formulary available from FLAVORx, Inc. After the desired flavoring is selected, the message "ready to dispense flavor" appears in step 7, followed by the message "dispensing flavor" in step 8, and the message "operation complete!" in step 8.

In the water reconstitution only process shown in FIG. 22, when the "recon only" option is selected in step 3, "ready to dispense water" is displayed in step 4, followed by display of "dispensing first half of water" in step 5, "pause for mixing then press ok to dispense second half of water" in step 6, "dispensing second half of water" in step 7, and "operation complete!" in step 8.

As shown in FIG. 23, when both water reconstitution and flavoring operations are desired, the user selects the "recon plus flavor" option in step 3. Flavoring options are then presented in step 4. Once the desired flavoring is selected, "ready to dispense water and flavor" is displayed in step 5, "dispensing first half of water and flavor" is displayed in step 6, "pause for mixing then press ok to dispense second half of water" is displayed in step 7, "dispensing second half of water" is displayed in step 8, and "operation complete!" is displayed in step 9.

Figure 24:
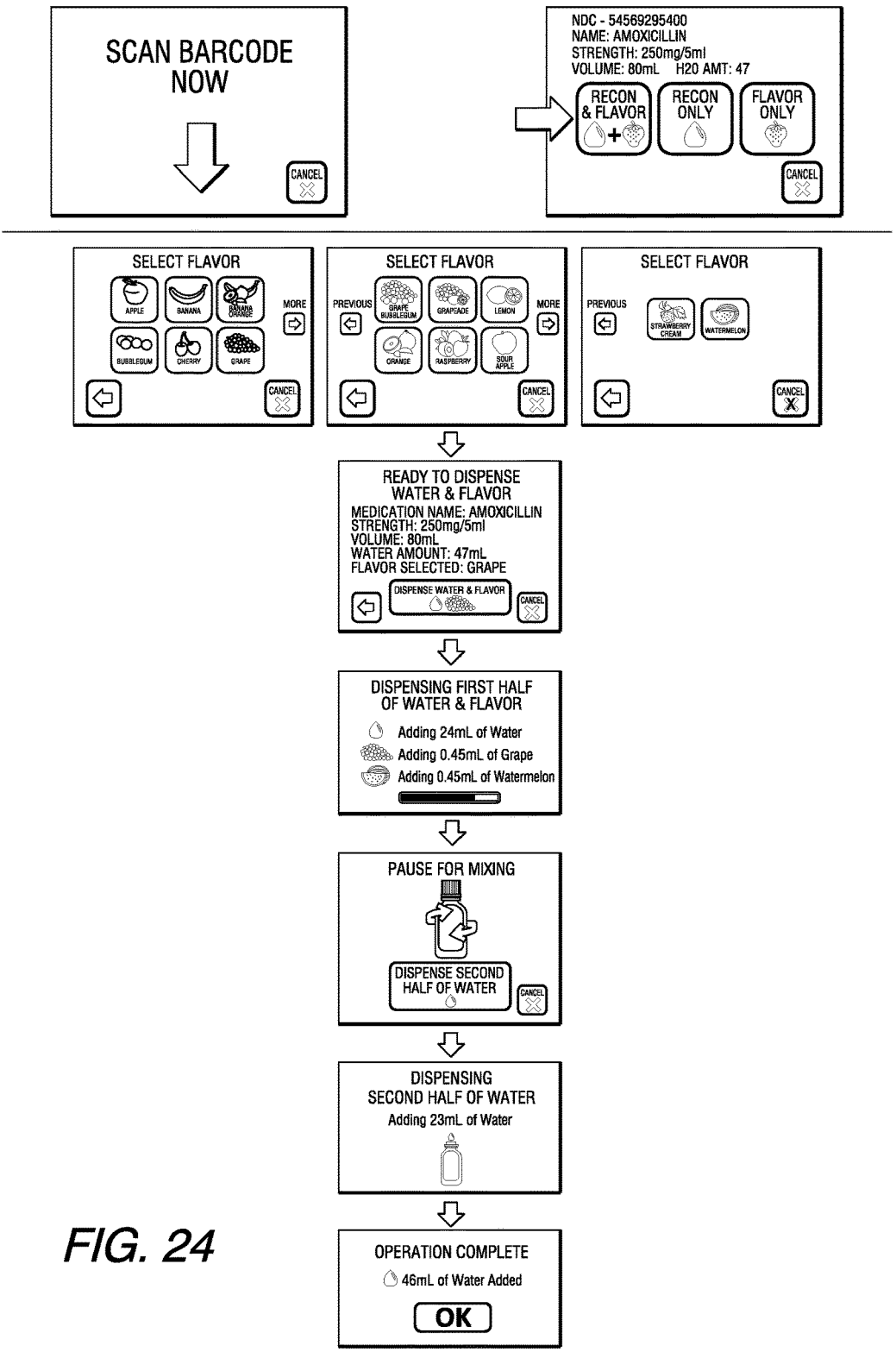
FIG. 24 illustrates a user interface for operation of an automatic flavoring and water dispensing system in accordance with another embodiment of the present invention.

FIG. 24 illustrates operation of a user interface in accordance with another embodiment of the present invention. In the embodiment shown, a container of Amoxicillin is read by a code scanner such as a bar code scanner, and the system automatically identifies several different possible flavorings that would be suitable for the Amoxicillin. The user can select one of the displayed flavors, and the system will automatically dispense an appropriate amount of water and liquid flavoring(s) into the Amoxicillin container. As shown in FIG. 24, the selected flavor and a portion of the water may be dispensed in an initial step, followed by dispensing of another amount of water that brings the total amount of dispensed water up to the total amount desired. The second water dispensing step may help to clear any residual flavor from the flavor delivery line. A burst of pressurized air may optionally be fed through the dispenser at the end of a dispensing operation in order to remove any residual flavor or water from the supply lines.

During medication flavoring and water reconstitution operations as described above, various types of information may be utilized by the system, including medication information, patient information, prescription information, flavoring usage information, accounting information, and the like. Medication information may include the identification of a particular medication to be flavored utilizing the input devices described above. Additionally, medication information may be transmitted to the dispensing unit from various other sources, such as from prescription information received by the pharmacy, e.g., from a doctor's office, another pharmacy, etc. Patient information may include patient medication data, patient medical data, and the like. For example, patient medication data may include types and amounts of prescription and non-prescription medications being taken by a patient currently and/or in the past. Patient medication data may also include flavoring preferences and/or historical flavoring selections for a patient. Flavoring information may include the types and amounts of flavorings dispensed by the system to individual patients and/or to multiple patients as a whole. Such flavoring information may be used to determine flavoring trends and preferences and/or to monitor flavoring usage of a dispensing system, e.g., for inventory or re-ordering purposes. Accounting information may be used to indicate that a flavoring has been added to a particular medication, and to allow a pharmacy to charge the patient or the patient's insurance company if desired.

In addition to medication flavoring use, the automatic dispensing systems of the present invention may be used for other purposes such as beverage dispensing. For example, alcoholic or non-alcoholic drinks may be automatically flavored with the dispensing system. As a particular example, the system may be used to automatically dispense various flavors of mixed drinks such as martinis. In this embodiment, a source of alcohol may be used in addition to, or in place of, the water supply. The alcohol may be provided in the form of a conventional liquor such as gin, vodka, rum, tequila and the like, or may be provided in the form of grain alcohol or another neutral-tasting form of alcohol. In this embodiment, the flavorings may include any types of flavorings typically added to alcoholic drinks. In the case of martinis, traditional martini mixers and/or flavorings may be used, and a user may be presented with multiple pre-selected martini flavoring options. Alternatively, a user may be provided with the capability of selecting and mixing different types of flavorings and/or mixers. In either case, the dispensing unit may store the particular flavoring preference(s) of a particular user, and may utilize such flavoring preference information in the future when a user subsequently uses the dispensing system again.

The processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium. Certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent, and/or semi-temporary, including non-transitory varieties thereof. Memory and/or storage components may be implemented using any computer-readable media capable of storing data such as volatile or non-volatile memory, removable or non-removable memory, erasable or non-erasable memory, writeable or re-writeable memory, and so forth.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments.

In general, it will be apparent to one of ordinary skill in the art that various embodiments described herein, or components or parts thereof, may be implemented in many different embodiments of software, firmware, hardware, and/or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication, G.hn WiFi or Bluetooth. The computer networks may also be embodied as one or more of the following types of networks: local area network (LAN); metropolitan area network (MAN); wide area network (WAN); virtual private network (VPN); storage area network (SAN); or global area network (GAN), among other network varieties.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

Whereas particular embodiments of this invention have been described above for purposes of illustration, it will be evident to those skilled in the art that numerous variations of the details of the present invention may be made. For example, in addition to flavoring and reconstitution of medications, the automatic dispensing systems of the present invention may be used to flavor various types of beverages. As a particular example, the present automatic dispensing systems may be used to selectively flavor alcoholic drinks, e.g., by delivering alcohol in place of or in addition to water, and providing various flavorings that may be selectively mixed and dispensed with the alcohol. Such variations may be made without departing from the invention as defined in the appended claims.

What is claimed is:

1. An automatic medication flavoring and water dispensing system comprising:
    multiple medication flavoring container receiving cradles including a flavoring extraction fixture and a flavoring delivery line corresponding to each cradle;
    a water supply line;
    a valve assembly in flow communication with the flavoring delivery lines structured and arranged to selectively control flow of multiple flavorings from the flavoring delivery lines to a flavoring outlet of the valve assembly;
    a flavoring and water dispensing nozzle assembly in flow communication with the flavoring outlet of the valve assembly and the water supply line; and at least one flavoring container installed in at least one of the cradles, wherein the flavoring container comprises:
a flavoring container body;
a container cap sealed to the flavoring container body comprising a sealable pressurized air inlet port extending through a top face of the cap into an interior of the flavoring container body, and a sealable flavoring outlet port extending through the top face of the cap into the interior of the flavoring container body; and
a flavoring extraction tube in fluid communication with the flavoring outlet port and extending downward to a bottom corner of the flavoring container body.

2. The automatic medication flavoring and water dispensing system of claim 1, wherein the valve assembly is in flow communication with the water supply line.

3. The automatic medication flavoring and water dispensing system of claim 1, further comprising a water flow control valve in flow communication with the water supply line structured and arranged to selectively control flow of water from the water supply line to the dispensing nozzle assembly.

4. The automatic medication flavoring and water dispensing system of claim 1, further comprising:
an input device for identifying a type of medication to be flavored; and
an electronic computer processor for determining an amount of medication flavoring to deliver from the flavoring and water dispensing nozzle depending on the identified type of medication.

5. The automatic medication flavoring and water dispensing system of claim 4, wherein the input device comprises a bar code scanner.

6. The automatic medication flavoring and water dispensing system of claim 4, wherein the input device comprises a touch screen display.

7. The automatic medication flavoring and water dispensing system of claim 4, further comprising:
a flavor selection input device for selecting a flavor taste from multiple flavor taste options; and
a digital formulary for determining a flavor recipe based on the selected flavor taste and the identified type of medication to be flavored.

8. The automatic medication flavoring and water dispensing system of claim 1, wherein the valve assembly comprises:
an upper valve block;
a solenoid valve assembly mounted on the upper valve block comprising multiple solenoids with solenoid valve plungers extending through the upper valve block;
a lower valve block comprising multiple flavoring delivery holes extending through the lower valve block and aligned with corresponding ones of the solenoid valve plungers;
multiple flavoring delivery channels in an upper surface of the lower valve block in controllable fluid flow communication with the multiple flavoring delivery holes; and
a deformable valve membrane between the upper and lower valve blocks structured and arranged to block the flavoring delivery holes when the solenoid valve plungers are in extended positions pressing against portions of the valve membrane, and to allow flow through the flavoring delivery holes and into the multiple flavoring delivery channels when the solenoid valve plungers are in retracted positions.

9. The automatic medication flavoring and water dispensing system of claim 8, wherein the each flavoring delivery hole terminates at an annular projection located radially inside a valve seat recess, the valve membrane comprises multiple contact disks that are each located radially inside an annular compliance recess, and each contact disk of the valve membrane contacts and seals against a corresponding one of the annular projections of the flavoring delivery holes when a corresponding one of the solenoid valve plungers is in the extended position.

10. The automatic medication flavoring and water dispensing system of claim 8, wherein the multiple flavoring delivery channels are in flow communication with a flavoring delivery manifold and a flavoring delivery tube.

11. The automatic medication flavoring and water dispensing system of claim 10, further comprising:
at least one purge channel in the upper surface of the lower valve block in fluid flow communication with the flavoring delivery manifold and flavoring delivery tube; and
at least one purge fluid supply line in controllable fluid flow communication with the at least one purge channel for selectively delivering at least one purge fluid to the flavoring delivery manifold and the flavoring delivery tube.

12. The automatic medication flavoring and water dispensing system of claim 11, wherein the purge fluid comprises water.

13. The automatic medication flavoring and water dispensing system of claim 11, wherein the purge fluid comprises air.

14. The automatic medication flavoring and water dispensing system of claim 8, wherein the solenoid valve plungers are biased toward their extended positions, and each solenoid valve plunger is movable to its retracted position for a selected amount of time to allow a predetermined amount of a flavoring liquid to flow from the corresponding flavoring delivery hole into the corresponding flavoring delivery channel during a flavoring dispensing operation.

15. The automatic medication flavoring and water dispensing system of claim 14, wherein the predetermined amount of flavoring liquid is selected from a formulary of flavoring recipes.

16. The automatic medication flavoring and water dispensing system of claim 1, wherein the flavoring extraction fixture of each medication flavoring container receiving cradle comprises:
a flavoring outlet needle tube structured and arranged to be inserted into a flavoring outlet port of a flavoring container cap when a flavoring container is installed in the cradle; and
an air pressure inlet needle tube structured and arranged to be inserted into an air pressure inlet port of the flavoring container cap when the flavoring container is installed in the cradle.

17. The automatic medication flavoring and water dispensing system of claim 1, wherein the cradle comprises a recess into which the container cap is inserted, and the recess and cap comprise means to only allow insertion of the cap into the recess in a single orientation in which the air inlet port and flavoring outlet port of the cap are aligned with corresponding air pressure inlet and flavor outlet tubes of the flavoring extraction fixture.

* * * * *